(12) United States Patent
Miyamoto et al.

(10) Patent No.: US 7,327,987 B2
(45) Date of Patent: Feb. 5, 2008

(54) BASE STATION CONTROL EQUIPMENT, RADIO BASE STATION EQUIPMENT, RADIO TERMINAL EQUIPMENT, AND MOBILE COMMUNICATION SYSTEM

(75) Inventors: Shoichi Miyamoto, Kawasaki (JP); Masato Tsuji, Kawasaki (JP); Toshio Kato, Tokyo (JP); Masatoshi Watanabe, Yokohama (JP)

(73) Assignees: Fujitsu Limited, Kawasaki (JP); Matsushita Electric Industrial Co., Ltd., Osaka (JP); Oki Electric Industry Co., Ltd., Tokyo (JP)

( * ) Notice: Subject to any disclaimer, the term of this patent is extended or adjusted under 35 U.S.C. 154(b) by 1172 days.

(21) Appl. No.: 09/814,241

(22) Filed: Mar. 21, 2001

(65) Prior Publication Data
US 2002/0002063 A1 Jan. 3, 2002

(30) Foreign Application Priority Data
Jul. 3, 2000 (JP) ............................ 2000-201037

(51) Int. Cl.
*H04B 7/00* (2006.01)
(52) U.S. Cl. ...................... 455/69; 455/522; 455/436; 455/442; 370/342; 370/335
(58) Field of Classification Search ................ 455/69, 455/522, 436, 442; 370/342, 335, 67.16
See application file for complete search history.

(56) References Cited
U.S. PATENT DOCUMENTS

| 5,487,180 | A | | 1/1996 | Ohtake |
| 6,085,106 | A | * | 7/2000 | Sendonaris et al. ......... 455/522 |
| 6,405,021 | B1 | * | 6/2002 | Hamabe ....................... 455/69 |

FOREIGN PATENT DOCUMENTS
JP          09-074378          3/1997

* cited by examiner

*Primary Examiner*—Sanh D. Phu
(74) *Attorney, Agent, or Firm*—Katten Muchin Rosenman LLP

(57) ABSTRACT

This invention relates to base station control equipment, radio base station equipment and radio terminal equipment that together constitute a mobile communication system. These base station control equipment, radio base station equipment and radio terminal equipment of this invention update transmitting power of a radio channel allotted to a new visit-zone to a greater and suitable value in time sequence. Therefore, mobile communication system according to the invention can keep speech quality of a completed call and transmission quality at high levels, can improve the number of radio channels that can be formed in parallel in a common frequency band (system capacity) or an information content of information that can be transmitted in parallel with desired transmission quality, and can improve utilization efficiency of a radio frequency.

4 Claims, 20 Drawing Sheets

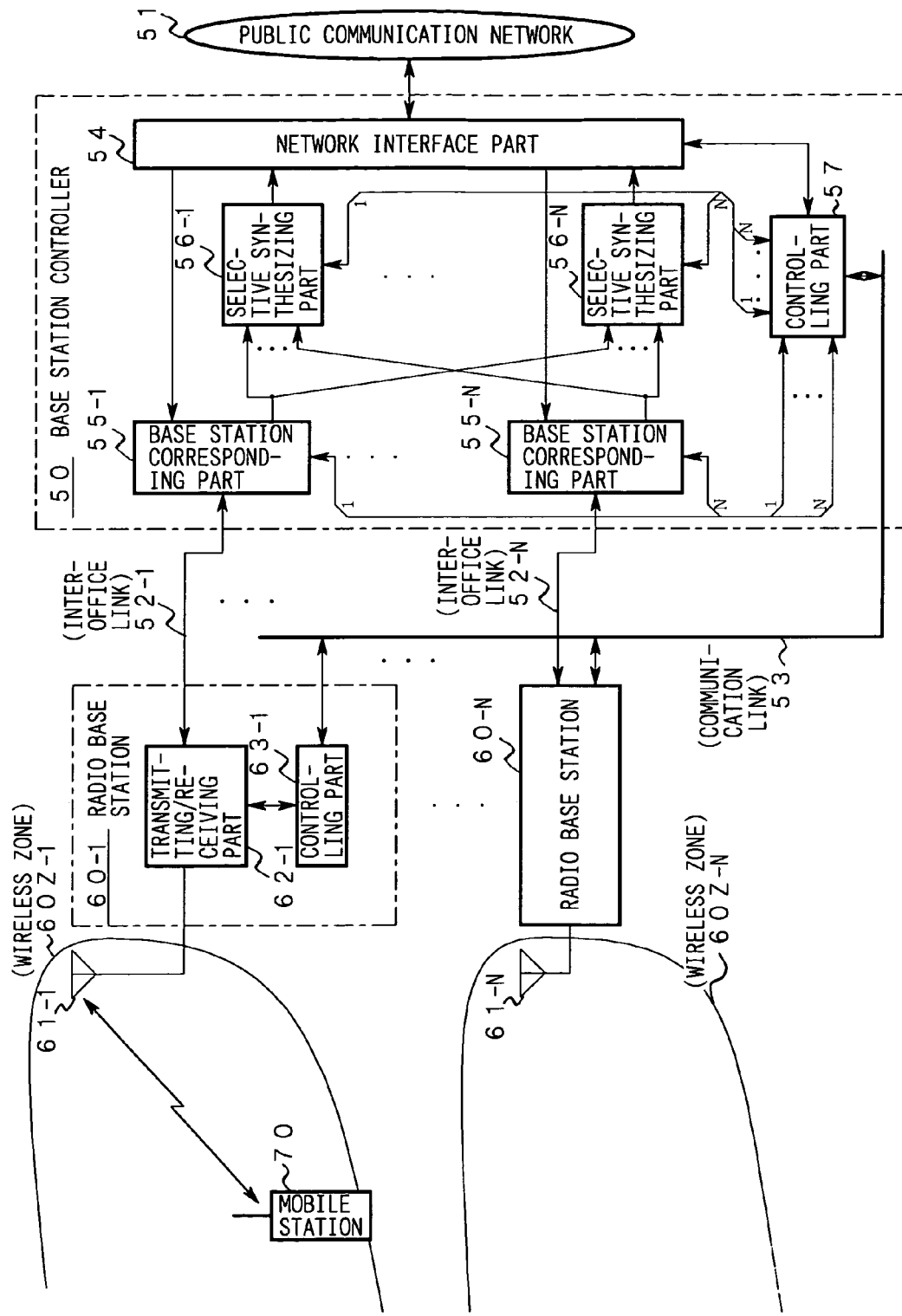
PRIOR ART FIG. 20

BASE STATION CONTROL EQUIPMENT, RADIO BASE STATION EQUIPMENT, RADIO TERMINAL EQUIPMENT, AND MOBILE COMMUNICATION SYSTEM

BACKGROUND OF THE INVENTION

1. Field of the Invention

The invention relates to base station control equipment for primarily executing channel control (allotment of radio channels, etc.) in a mobile communication system, to radio base station equipment for individually forming wireless zones under this channel control, to radio terminal equipment for offering communication services to subscribers situated in any of these wireless zones, and to a mobile communication system comprising these base station control equipment, radio base station equipment and radio terminal equipment.

2. Description of the Related Art

A CDMA system essentially has a confidentiality and interference-resistibility and can flexibly adapt itself to diversified channel allocations and multimedia communication. Because a technology of transmitting power control that can solve the near-far problem has been established recently, the CDMA system has been positively applied to the mobile communication system.

In such a mobile communication system, an individual mobile station can visit both in a close range of a radio base station and in a fringe region of wireless zone formed by the base station. Therefore, the transmission characteristics of a radio transmission channel formed between the mobile station and the radio base station can vary over a broad range.

The level of transmitting power of both or either of these mobile station and/or radio base station is therefore varied appropriately in order to secure desired transmission quality and service quality.

FIG. 20 of the accompanying drawings shows a structural example of the mobile communication system to which the CDMA system is applied.

In the drawing, a base station controller 50 is connected to a public communication network 51 and also to a plurality of radio base stations 60-1 to 60-N through inter-office links 52-1 to 52-N and through a communication link 53. A mobile station 70 visits in any of wireless zones 60-1 to 60Z-N that are individually formed by these radio base stations 60-1 to 60-N.

The base station controller 50 comprises the following constituent elements:

network interfacing part 54 connected to the public communication network 54;

a plurality N of base station corresponding parts 55-1 to 55-N each having a downlink input connected individually and directly to each of N downlink outputs of the network interfacing part 54, and connected to one of the ends of communication links 52-1 to 52-N;

selective synthesizing parts 56-1 to 56-N each having an output thereof connected directly to each of N uplinks of the network interfacing part 54, and connected directly to all of uplink output of the base station corresponding parts 55-1 to 55-N; and a controlling part 57 having communication port connected to one end of the communication link 53 and input/output ports connected respectively to the control terminals of the network interfacing part 54, the base station corresponding parts 55-1 to 55-N and the selective synthesizing parts 56-1 to 56-N.

The radio base station 60-1 comprises the following constituent elements:

an antenna 61-1;

a transmitting/receiving part 62-1 connected between a feeding point of the antenna 61-1 and the other end of the inter-office link 52-1; and a controlling part 63-1 having an input/output port connected to the control terminal of the transmitting/receiving part 62-1 and a communication port connected to the other end of the communication link 53.

Incidentally, the construction of the radio base stations 60-2 to 60-N is the same as that of the base station controller 60-1. Therefore, suffixes "2" to "N" are put to the corresponding constituent element and their explanation and illustration will be hereinafter omitted.

In the mobile communication system having the construction described above, the controlling part 63-1 provided to the radio base station 60-1 transmits and receives predetermined control information with the controlling part 57 provided to the base station controller 50, controls the operation of the transmitting/receiving part 62-1 on the basis of the procedure of channel control executed primarily by the controlling part 57, and forms the wireless zone 60Z-1 through the transmitting/receiving part 62-1 and the antenna 61-1.

Incidentally, the operation of each part of the radio base stations 60-2 to 60-N is the same as the operation executed in the radio base station 60-1 as described above. Therefore, explanation will be omitted for the sake of simplicity.

On the other hand, the controlling part 57 in the base station controller 50 executes the channel control described above on the basis of a procedure that is determined in advance for converting a call occurring in the mobile station 70 to a completed call.

This channel control procedure and the processing, listed below, accomplished by the controlling part 57 during the channel control process can be achieved by various known technologies, and they do not constitute the gist of the invention. Therefore, their explanation will be omitted.

a processing for forming, or releasing, paths of down speech signals, ranging from the public communication network 51 to the inter-office links 52-1 to 52-N through the network interfacing part 54 and the base station corresponding parts 55-1 to 55-N;

a processing for forming, or releasing, paths of upstream speech signals, ranging from the inter-office links 52-1 to 52-N to the public communication network 51 through the base station corresponding parts 55-1 to 55-N, the selective synthesizing parts 56-1 to 56-N and the network interfacing part 54;

a processing for transmitting and receiving signaling signals with the public communication network 51 through the network interfacing part 54; and a processing for transmitting and receiving control information relating to channel control with the mobile station 70 through the communication link 53 and the radio base stations 60-1 to 60-N.

The controlling part 63-1 to 63-N in each radio base station 60-1 to 60-N forms radio channels (inclusive of the radio channel offered for transmission of the speech signal and the radio channel allotted to the call that occurs anew and is not yet a completed call) suitable for a predetermined channel allocation through the transmitting/receiving part 62-1 to 62-N and the antenna 61-1 to 61-N.

The control information described above is transmitted through such a radio channel.

The mobile station 70 can move from the wireless zone 60Z-1 to the wireless zone 60Z-2 adjacent thereto even during the period in which the completed call occurring in the local station still exists.

In other words, the controlling part 57 provided to the base station controller 50 cooperates with these radio base stations 60-1 and 60-2 on the basis of the channel control procedure while the mobile station 70 is moving to an area where the wireless zones 60Z-1 and 60-2 overlap with each other, or visits in such an area, for example.

During such a cooperating process, the controlling part 57 applies identifiers of these radio base stations 60-1 and 60-2 and the identifier of the first radio channel already allotted to the mobile station 70 and to be used for transmitting/receiving the speech signal, to the selective synthesizing part 56-1.

The selective synthesizing part 56-1 selects two upstream speech signals that the radio base stations 60-1 and 60-2 (transmitting/receiving parts 62-1 and 62-2) identified by these identifiers have received in parallel through the first radio channel, and synthesize these upstream speech signals and apply the resulting speech signal to the network interfacing part 54.

In consequence, the speech signal having satisfactory quality can be transmitted to the originating party or the destination party, at the completed call that has occurred in the mobile station 70 which is connected to the public communication network 51 and in which the completed call occurs, under soft hand-off (diversity hand-over) executed by the mobile station 70 in cooperation with the radio base stations 60-1 and 60-2 and the base station controller 50.

Incidentally, the mobile station 70 sets the level of transmitting power of the radio channel used for the conversation in the local station to a greater value when the level of the reception wave reaching from the radio base station 60-1 that forms the wireless zone 60Z-1 corresponding to the former visit-zone of soft hand-off described above is smaller.

The transmitting/receiving part 62-1, 62-2 in each radio base station 60-1, 60-2 measures the level of the reception wave reaching the antenna 6-1, 61-2 from the mobile station 70. Each controlling part 63-1, 63-2 sets the level of transmitting power to be transmitted by the transmitting/receiving part 62-1, 62-2 to a greater level when the level of the reception wave so measured is smaller.

Even when the relative distance between the radio base stations 60-1, 60-2 and the mobile station 70 and the transmission characteristics in the wireless zones 60Z-1 and 60Z-2 vary or fluctuate, the communication service having high transmission quality can be offered with reliability to the mobile station 70.

During the process in which the mobile station 70 moves from the area where the wireless zones 60Z-1 and 60Z-2 overlap with each other to the area belonging only to the wireless zone 60Z-2 without the extinction of the completed call described above, the controlling part 57 provided to the base station controller 50 cooperates with the controlling parts 63-1 and 63-2 provided to the radio base stations 60-1 and 60-2 on the basis of the channel control procedure described already.

In such a channel control process, the controlling part 57 allots an vacant radio channel (hereinafter called the "second radio channel") in the wireless zone 60Z-2 corresponding to the new visit-zone in place of the first radio channel allotted previously, and instructs the controlling part 63-2 provided to the radio base station 60-2 to start transmission of the second radio channel through the communication link 53.

The mobile station 70 starts transmission to the second radio channel, in place of the first radio channel at transmitting power equal to any of the following prescribed values on the basis of the channel control procedure:

a prescribed value equal to transmitting power of the first radio channel transmitted by the radio base station 60-1;

a prescribed value $P_T$ computed as a value satisfying both of the following conditions (a) and (b), and given in advance as a constant which is, for example, the base station controller 50 and the radio base station 60-2 written into an ROM, etc., mounted to the controlling part 57, 63-2;

(a) Desired minimum transmission quality Eb/lo can be secured for the radio channels relative to the field strength Ec/lo of a rated pilot channel when radio transmission is executed for all the radio channels; and (b) The following formula is given as to the power distributions $P_P$, $P_S$, $P_{PG}$ given to a pilot channel, a synchronizer channel and a paging channel, respectively, on the basis of the channel allocation and the office establishment condition of the radio base stations 42-1 and 42-2, the number $N_{SP}$ of the speech channels to be used for transmission of the speech signal among the radio channels described above, an upper limit value U set in advance as means for preventing power distributed to these communication channels from becoming excessively large even when the number of subscribers is excessively small and the width X of the range of transmitting power to be varied during the process of transmitting power control:

$$P_T = \{(1 - P_P - P_S - P_{PG})/N_{SP}\} - X/2$$

$$(P_T \leq U) \hspace{4cm} (\text{Eq. 1})$$

Consequently, the mobile station 70 can consecutively receive the communication service even when it is moving so long as it visits in any of the wireless zones 60Z-1 to 60Z-N.

In the prior art example described above, the level of transmitting power of the second radio channel at which the radio base station 60-2 forming the wireless zone 60Z-2 corresponding to the new visit-zone is to start transmission has been set to the prescribed value described above, for example, in any of the existing mobile communication systems to which the CDMA system is applied, because transmitting power is not stipulated as the specification and the rating.

However, when this prescribed value is excessively large, interference to the downlink of the radio transmission channel applied to transmission of the speech signal becomes great in any of the mobile stations other than the mobile station 70 in which the completed call occurring exists in parallel among the mobile stations located in any of the wireless zones 60Z-1 to 60Z-N. When the prescribed value is excessively small, on the contrary, speech quality possibly drops remarkably.

The prescribed value described above can be set highly accurately, in principle, as the value adapted to the channel allocation in combination with the construction and arrangement of the wireless zones.

However, transmission quality of the downstream radio transmission channels formed between the radio base station 60-1 to 60-N and the individual mobile station located in the wireless zone 60Z-1 to 60Z-N can generally fluctuate drastically and incessantly depending on the distribution of landform and planimetry in these wireless zones 60Z-1 to 60Z-N.

In other words, this prescribed value cannot be practically a common value to all the radio base stations 60-1 to 60-N.

Even when a complicated processing is executed to optimize the zone configuration and the distribution of landform and planimetry, the prescribed value cannot be computed always as a value that sufficiently satisfies the requirements for maintenance and operations.

For these reasons, the prescribed value has been set to a rather greater value in the existing mobile communication systems to secure a margin necessary for securing highly accurately desired service quality without taking numerous conditions on the system configuration and on the operation and maintenance and inspection into consideration.

According to such a prescribed value, transmitting power of the individual radio channels these radio base stations 60-1 to 60-N transmit adds to the running cost of the radio base stations 60-1 to 60-N.

Therefore, when the number of mobile stations (the number of simultaneous speakers) that transmit and receive in parallel the speech signals by using in common the common band decreases according to the increase of interference described above, the running cost might further increase.

SUMMARY OF THE INVENTION

It is an object of the invention to provide base station control equipment, radio base station equipment, radio terminal equipment and a mobile communication system each being capable of setting transmitting power of a radio channel allotted anew to a new visit-zone to an appropriate value without changing a basic hardware construction.

It is another object of the invention to suppress or avoid unnecessary interference and jamming resulting from excessive transmitting power of a radio channel where a radio base station forming a new visit-zone is to execute transmission.

It is another object of the invention to keep high channel control efficiency and avoid the occurrence of interference and jamming resulting from unnecessary excessive transmitting power described above.

It is still another object of the invention to avoid interference and jamming resulting from unnecessary excessive transmitting power even when transmission quality of a radio transmission channel is likely to drop due to the occurrence of a loss and a multi-path resulting from a distribution of landform and planimetry in spite of a short distance between a candidate for a new visit-zone or a radio base station forming the new visit-zone.

It is still another object of the invention to quickly execute transmission to a mobile station in a new visit-zone or a candidate for the new visit-zone without unnecessary delay with transmitting power flexibly adaptable to transmission quality of a radio transmission channel formed between a radio base station and the mobile station.

It is still another object of the invention to improve hand-off efficiency.

It is still another object of the invention to reduce a load of channel control and realize flexible management of transmitting power of a radio channel in which a radio base station executes transmission in parallel by a local station, as channel control.

It is still another object of the invention to make it possible to apply the invention to a multimedia communication system.

It is still another object of the invention to improve channel control efficiency and independently execute management of transmitting power of a radio channel where a radio base station executes transmission in parallel, as channel control.

It is still another object of the invention to improve channel control efficiency and allow a mobile station to independently identify or manage a transmission rate of transmission information to be received by a local station during a channel control process.

It is still another object of the invention to suppress or avoid unnecessary interference and jamming resulting from excessive transmitting power more than in the prior art example in which the value of transmitting power at which a radio base station executes transmission is set in advance to a predetermined value although a distance between a mobile station and the radio base station forming a new visit-zone of the mobile station is not always constant.

It is still another object of the invention to keep high channel control efficiency and suppress or avoid unnecessary interference or jamming resulting from excessive transmitting power of a transmission wave transmitted by a radio base station forming a new visit-zone.

It is still another object of the invention to avoid the occurrence of interface and jamming resulting from an unnecessary increase of transmitting power even when transmission quality of a radio transmission channel formed between a radio base station and a mobile station drops due to a distribution of landform and planimetry although a relative distance from the mobile station is short.

It is still another object of the invention to eliminate the need for recognizing transmitting power of the radio channel through which each radio base station executes transmission for the purpose of computing transmitting power of a radio channel where a radio base station forming a new visit-zone is to execute transmission.

It is still another object of the invention to avoid updating of transmitting power of a radio channel to be transmitted to a radio base station forming a new visit-zone by an independent operation of radio terminal equipment, or without cooperating with the radio terminal equipment according to the invention.

It is still another object of the invention to quickly execute a continuity test or a processing for determining a radio base station as the one for forming a new visit-zone while keeping cooperating with the radio base station even when a relative distance to the radio base station forming the new visit-zone is long.

It is still another object of the invention to allow a radio base station forming a new visit-zone, or a base station controller installed as a higher-rank office of the radio base station to reliably compute transmitting power according to transmission quality of the new visit-zone obtained by the radio terminal equipment according to the invention.

It is still another object of the invention to allow a radio base station forming a new visit-zone, or a base station controller installed as a higher-rank office of the radio base station to reliably compute transmitting power according to the transmission rate obtained by the radio terminal equipment according to the invention.

It is still another object of the invention to keep high speech quality of a completed call or transmission quality, improve the number (system capacity) of radio channels that can be formed in parallel in a common frequency band, or a content of information to be transmitted in parallel, with desired transmission quality, to improve utilization efficiency of a radio frequency, and thus to reduce a running cost and improve service quality in a mobile communication system to which the invention is applied.

The objects described above can be accomplished by base station control equipment where transmitting power of a radio channel where a radio base station forming a new visit-zone is to newly execute transmission, is gradually updated to a greater value from the starting point of transmission.

In such base station control equipment, transmitting power of a transmission wave transmitted by a radio base station forming a new visit-zone of the radio base station to the mobile station, gradually has a greater value in order of time sequence after the start of transmission.

The objects described above can be accomplished by base station control equipment where the time point at which transmitting power is to be updated is decided according to independent timing.

In such base station control equipment, transmitting power is set not by cooperating with a radio base station and a mobile station but by their exchange of messages and it is updated to a greater value in order of time sequence.

The objects described above can be further accomplished by base station control equipment where a notice of the start of transmission of a new visit-zone is sent to a terminal, and transmitting power is updated when a transmitting power update request transmitted by the terminal in response to the notice, is identified.

In such base station control equipment, a radio base station forming a new visit-zone or a candidate for the new visit-zone suspends updating of transmitting power until transmission quality of a radio transmission channel formed to a mobile station becomes satisfactory enough to execute transmission of the transmitting power update request.

The objects described above can be further accomplished by base station control equipment where the response to the notice is given through the radio base station forming a former visit-zone.

In such base station control equipment, the response above is identified with reliability so long as the mobile station is located in the former visit-zone even when a distance between the candidate for the new visit-zone or the radio base station forming the new visit-zone and the mobile station is long.

The objects described above can be further accomplished by base station control equipment where the initial value of transmitting power of a new visit-zone is set to a value equal to or greater than the sum of the differences between the levels of reception waves reaching the former visit-zone and the radio base station forming the new visit-zone from the terminal and the level of transmitting power of the radio base station corresponding to the former visit-zone.

In such base station control equipment, transmitting power at which the radio base station forming the new visit-zone is to execute transmission to the radio channel allotted anew is set to a value for compensating the difference of the transmission loss of the radio transmission channel formed between the radio base station and the mobile station.

The objects above can be further accomplished by base station control equipment where a radio base station itself notifies the level of transmitting power of the radio base station forming a former visit-zone.

In such base station control equipment, transmitting power at which the radio base station forming the new visit-zone is to execute transmission to the radio channel allotted anew is set to a value suitable for substantial transmission characteristics of the radio transmission channel formed between the radio base station and the mobile station without managing or recognizing transmitting power.

The objects described above can be further accomplished by base station control equipment where the level of a reception wave reaching a terminal from a radio base station forming a new visit-zone is notified by the terminal through the radio base station forming the former visit-zone, the propagation loss between both is computed according to the level of transmitting power transmitted in the new visit-zone and the level of the reception level at that point, and the level of transmitting power of the new visit-zone is set to a level equal to or greater than a difference between a prescribed value of the reception wave to reach the terminal through the new visit-zone, and the propagation loss.

In such base station control equipment, transmitting power at which the radio base station forming the new visit-zone is to execute transmission to the radio channel allotted anew is set to a value for compensating the substantial transmission loss of the radio transmission channel formed between the radio base station and the mobile station.

The objects described above can be further accomplished by base station control equipment where a transmission speed of transmission information to a terminal in a former visit-zone through a downlink is obtained to vary the level of transmitting power to a value proportional to the speed.

In such base station control equipment, transmitting power at which a radio base station forming the former visit-zone is to execute transmission to the radio channel allotted anew, is kept at a value suitable for the transmission rate even when the transmission rate of the transmission information to be transmitted through the downlink of the radio channel increases or decreases.

The objects described above can be further accomplished by base station control equipment where the speed is given from a radio base station forming a former visit-zone.

In such base station control equipment, channel control efficiency can be improved, and the radio base station can independently manage transmitting power of the radio channel where a local station is to execute transmission in parallel, as channel control.

The objects described above can be accomplished further by base station control equipment where a speed is given from radio terminal equipment through a radio base station forming a former visit-zone.

In such base station control equipment, on the initiative of the base station forming the former visit-zone, the transmission rate is given as a reference of an increase or a decrease of transmitting power, and it is not necessary to manage and recognize the transmission rate during the channel control process.

The objects above can be further accomplished by radio base station equipment having the same function as that of the base station control equipment described above.

In such radio base station equipment, when a local station corresponds to a radio base station that forms a former visit-zone of a mobile station, transmitting power of a transmission wave transmitted to the radio base station has a value to be greater in order of time sequence after the start of transmission.

The objects described above can be further accomplished by radio base station equipment where a level of transmitting power of a local station is notified to a base station controller on the basis of a channel control procedure.

In such radio base station equipment, transmitting power is set not by cooperating with the base station controller and the mobile station but by mutually exchanging messages with them, and is updated to a value to be greater in order of time sequence.

The objects described above can be further accomplished by radio base station equipment where a level of a reception wave reaching radio terminal equipment through a new visit-zone is given by this radio terminal equipment, and its level is notified to base station control equipment.

In such radio base station equipment, updating of transmitting power is suspended until transmission quality of a radio transmission channel formed to a mobile station becomes satisfactory.

The objects described above can be further accomplished by radio base station equipment where a speed of a downlink is notified to a base station controller.

In such radio base station equipment, transmitting power can be used for computation of transmitting power of a radio channel where transmission is to be newly executed in a new visit-zone even when a local station forms a wireless zone to a former visit-zone or the new visit-zone.

The objects described above can be further accomplished by radio base station equipment where a speed given from radio terminal equipment through an uplink is transferred to base station control equipment.

In such radio base station equipment, transmitting power can be used for the computation of transmitting power of a radio channel which is given by the mobile station and where transmission is to be newly performed in a new visit-zone.

The objects described above can be further accomplished by radio terminal equipment where transmission quality of a new visit-zone is monitored in accordance with a notice, and when the transmission quality is below a predetermined threshold value, updating of transmitting power is requested to a radio base station forming the new visit-zone.

In such radio terminal equipment, the response to the request is allotted to the radio terminal equipment according to the invention, and signifies a time point at which transmitting power of the radio channel where the radio base station forming a new visit-zone to which the radio terminal equipment is to transfer or a candidate for the new visit-zone executes transmission, is to be updated.

The objects above can be further accomplished by radio terminal equipment where transmission quality of a new visit-zone is monitored and when transmission quality is below a predetermined threshold value, updating of transmitting power is requested to a radio base station forming a former visit-zone.

In such radio terminal equipment, a response to the demand is transmitted with promptness and reliability to the radio base station forming the former visit-zone and a base station controller installed as a higher-rank office to the radio base station, compared to the case where the response is transmitted through the radio base station forming the new visit-zone or a candidate for the new visit-zone.

The objects described above can be further accomplished by radio terminal equipment where a level of a reception wave reaching through a new visit-zone is measured to transmit the level to a radio base station forming a former visit zone.

In the radio terminal equipment described above, transmission quality can be used for computation of transmitting power at which transmission to a radio channel allotted anew to the new visit-zone is to be performed.

The objects described above can be further accomplished by radio terminal equipment where a speed of transmission information to be received through a downlink is obtained in a former visit-zone to notify the speed to a radio base station (to base station control equipment through this radio base station) forming the former visit-zone.

In the radio terminal equipment described above, the transmission rate can be used for computation of transmitting power at which transmission to a radio channel allotted anew to the new visit-zone is to be performed.

BRIEF DESCRIPTION OF THE DRAWINGS

The nature, principle, and utility of the invention will become more apparent from the following detailed description when read in conjunction with the accompanying drawings in which like parts are designated by identical reference numbers, in which:

FIG. 20 shows a structural example of a mobile communication system of a CDMA system.

DESCRIPTION OF THE PREFERRED EMBODIMENTS

Figure 1:
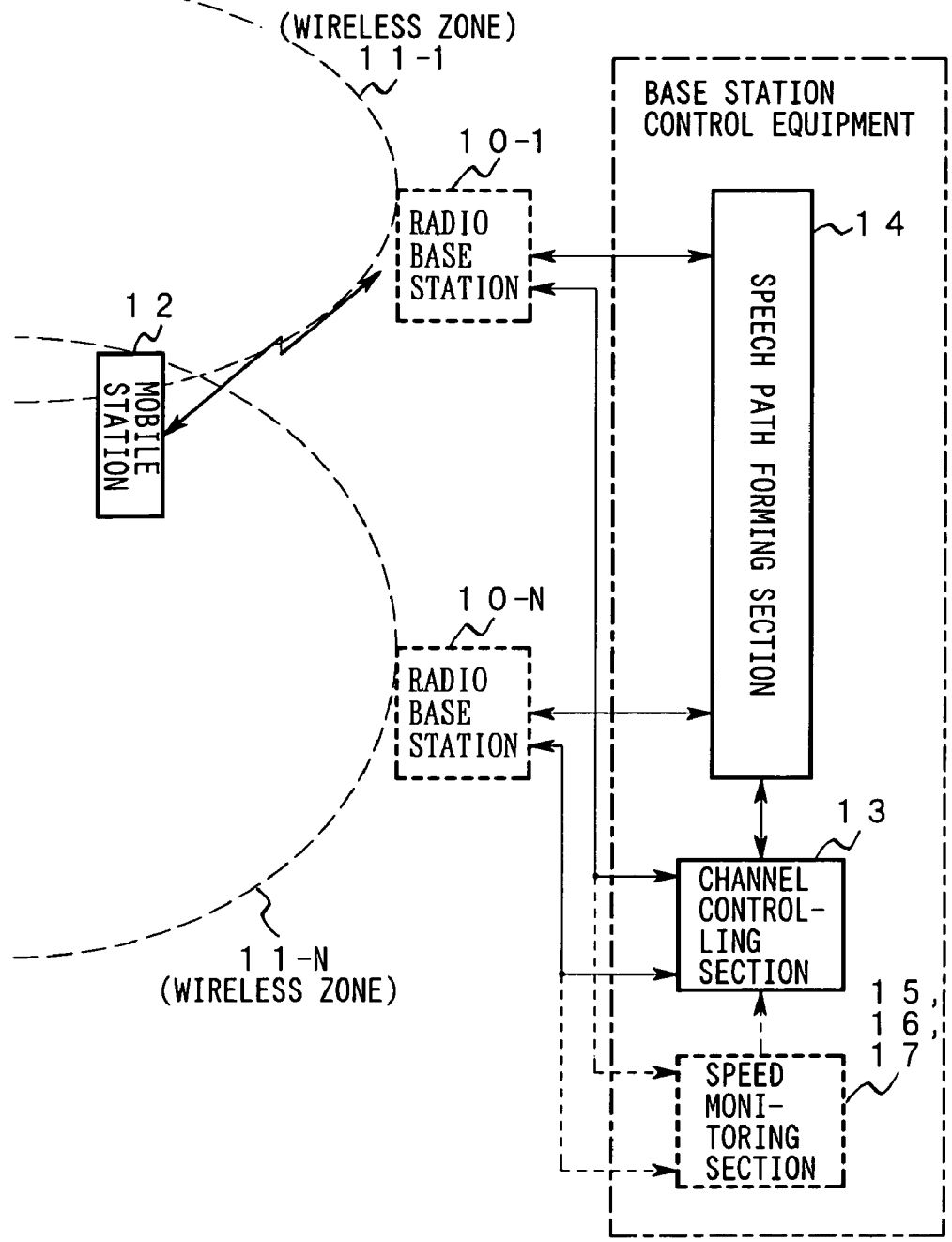
FIG. 1 is a block diagram showing the principle of base station control equipment according to the invention.

Referring initially to FIG. 1, the principle of a base station controller according to the invention will be explained.

FIG. 1 is a block diagram showing the principle of base station control equipment according to the invention.

The base station control equipment shown in FIG. 1 comprises radio base stations 10-1 to 10-N for individually forming wireless zones 11-1 to 11-N in which a mobile station 12 can be situated, and a channel controlling section 13, a speech path forming section 14 and speed monitoring sections 15, 16 and 17, each being connected through a predetermined communication link.

The principle of the first base station control equipment according to the invention is as follows.

The channel controlling section 13 cooperates with a plurality N of radio base stations 10-1 to 10-N and executes channel control of the call occurring in the mobile station 12 situated in any of the wireless zones 11-1 to 11-N that these radio base stations individually form. The speech path forming section 14 forms a speech path inclusive of the radio channel to be used for a completed call occurring in the mobile station 12 under channel control by the channel controlling section 13. The channel controlling section 13 updates transmitting power of the radio channel allotted anew to the radio base station that forms a candidate for a new-visit zone of the completed call occurring in the mobile station 12 among a plurality N of radio base stations 10-1 to 12-N, or the new-visit zone itself, in which the transmitting power is updated to a greater value in order of time sequence.

In such base station control equipment, transmitting power of a transmission wave transmitted by the radio base station, that forms the new visit-zone of the mobile station 12, to this mobile station 12 becomes greater in order of time sequence after the start of transmission.

Therefore, although the distance between the radio base station forming the new visit-zone and the mobile station 12 is not always constant, unnecessary interference and jamming resulting from excess of transmitting power can be suppressed or avoided compared to the prior art example described above in which the value of transmitting power is set in advance to a prescribed value.

The principle of the second base station control equipment according to the invention is as follows.

The channel controlling section 13 independently determines either or both of a time point at which transmitting power of the radio channel allocated anew is to be updated and/or an increment of the transmitting power to be updated at this point.

In the base station controlling equipment described above, transmitting power is set as the radio base stations 10-1 to 10-N and the mobile station 10 exchange message without cooperating, and it is gradually updated to a value that becomes greater in order of time sequence.

Therefore, channel control efficiency can be maintained high, and interference and jamming resulting from excess of transmitting power of the transmission wave transmitted by the radio base station that forms the new visit-zone can be suppressed or avoided.

The principle of the third base station control equipment according to the invention is as follows.

When transmission is started for the radio channel allocated anew, the channel controlling section 13 notifies the start of transmission to the mobile station through the radio station that forms the new visit-zone among a plurality N of radio base stations. The channel controlling section 13 updates transmitting power every time the response to this notice is received from the mobile station through the candidate for the new visit-zone or the radio base station forming the new visit-zone.

In the base station control equipment described above, updating of transmitting power is suspended in the candidate for the new visit-zone or the radio base station forming the new visit-zone until transmission quality of the radio transmission channel formed between the candidate or the radio base station and the mobile station 12 becomes sufficient to receive the response above.

Therefore, although the distance between the radio base station forming the new visit-zone or the candidate for the new visit-zone and the mobile station is short, the occurrence of interference and jamming resulting from the unnecessary increase of transmitting power can be avoided even when transmission quality of the radio transmission channel is low in accordance with the occurrence of loss and multi-path resulting from the distribution of landform and planimetry.

The principle of the fourth base station control equipment according to the invention is as follows.

When transmission is started to the radio channel allotted anew, the channel controlling section 13 notifies the start of transmission to the mobile station among a plurality N of radio base stations 10-1 to 10-N through the radio base station forming a former visit-zone, and updates transmitting power every time the response to this notice is received from the mobile station through the radio base station forming the former visit-zone.

In the base station control equipment described above, the channel controlling section 13 can reliably identify the response so long as the mobile station is situated in the former visit-zone, even when the distance between the radio base station forming the new visit-zone or the candidate for the new visit-zone and the mobile station 12 is long.

In the new visit-zone or the candidate for the new visit-zone, therefore, transmission to the mobile station 12 is quickly executed without unnecessary delay with transmitting power flexibly adaptable to transmission quality of the radio transmission channel formed between the new visit-zone or the candidate for the new visit-zone and the mobile station 12.

The principle of the fifth base station control equipment according to the invention is as follows.

The channel controlling section 13 sets transmitting power of the radio channel allotted anew to a value equal to or greater than the product of: a ratio of the level of the reception wave reaching the radio base station forming the former visit-zone from the mobile station 12 to the level of the reception wave reaching in parallel to the radio base station forming the new visit-zone from the mobile station 12; and transmitting power at which the radio base station forming the former visit-zone in the radio channel allotted to the mobile station 12 transmits.

In the base station control equipment described above, transmitting power at which the radio base station forming the new visit-zone executes transmission of the radio channel allotted anew is set to a value for compensating the difference of a substantial transmission loss of the radio channel formed between the radio base station and the mobile station 12.

Therefore, channel control efficiency related to hand-off can be improved, and the occurrence of interference and jamming resulting from excess of transmitting power can be avoided.

The principle of the sixth base station control equipment according to the invention is as follows.

The channel controlling section 13 is notified of the transmitting power at which the radio base station forming the former visit-zone performs transmission to the radio channel allotted to the mobile station and employs the transmitting power for setting transmitting power of the radio channel allotted anew.

In the base station control equipment described above, even when the channel controlling section 13 does not manage or recognize transmitting power, transmitting power at which the radio base station forming the new visit-zone executes transmission of the radio channel allotted anew is set to a value adaptable to the substantial transmission characteristics of the radio channel formed between the radio base station and the mobile station 12.

Therefore, the load to the channel control executed by the channel controlling section 13 can be mitigated, and the channel control inclusive of management of transmitting power of the radio channel to be transmitted in parallel by the local station among the radio base station 10-1 to 10-N can be executed with flexibility.

The principle of the seventh base station control equipment according to the invention is as follows.

A predetermined level at which the reception wave reaches the mobile station 12 in order to have the mobile station 12 determine the new visit-zone is given to the channel controlling section 13. The level of the reception wave reaching the mobile station 12 from the radio base station forming the new visit-zone is notified to the channel controlling section 13 through the radio base station forming the former visit-zone. The channel controlling section 13 sets transmitting power of this radio channel to a value equal to or greater than a product of the ratio of the prescribed level to a level of the reception wave, and transmitting power at which the radio base station forming the new visit-zone executes transmission.

In the base station control equipment described above, transmitting power at which the radio base station forming the new visit-zone is to executes transmission to the radio channel allotted anew is set to a value for compensating the substantial transmission loss of the radio channel formed between the radio base station and the mobile station 12.

Therefore, channel control efficiency relating to hand-off can be improved, and the occurrence of interference and jamming resulting from the excess of transmitting power can be avoided.

The principle of the eighth base station control equipment according to the invention is as follows.

The speed monitoring section 15 monitors a transmission rate at which the transmission information is radio-transmitted to the mobile station 12. The channel controlling section 13 sets transmitting power of the radio channel allotted anew to a value proportional to the transmission rate.

In the base station control equipment described above, transmitting power at which the radio base station forming the new visit-zone executes transmission to the radio channel allotted anew is kept at a value suitable for the transmission rate even when the transmission rate of the transmission information to be transmitted through a downlink of the radio channel increases or decreases.

Therefore, the invention can be applied to multimedia communication.

The principle of the ninth base station control equipment according to the invention is as follows.

The speed monitoring section 16 obtains a transmission rate which is given by the radio base station forming the former visit-zone among a plurality N of radio base stations 10-1 to 10-N and at which the radio base station is to radio-transmit the transmission information to the mobile station 12. The channel controlling section 13 sets transmitting power of the radio channel allotted anew to a value proportional to the transmission rate.

In the base station control equipment described above, the transmission rate as a reference of the increase/decrease of transmitting power is mainly given by the radio base station that forms the former visit-zone, and the channel controlling section 13 need not manage and recognize such a transmission rate during its channel control process.

In consequence, channel control efficiency can be improved, and the radio base stations 10-1 to 10-N can independently manage transmitting power of the radio channel to be transmitted in parallel by the local station, as channel control.

The principle of the tenth base station control equipment according to the invention is as follows.

The speed monitoring section 17 obtains a transmission rate which is given by mobile station 12 through the radio base station forming the former visit-zone among a plurality N of radio base stations 10-1 to 10N and at which the transmission information is to be radio-transmitted from the radio base station to the mobile station 12. The channel controlling section 13 sets transmitting power of the radio channel allotted anew to a value proportional to the transmission rate obtained by the speed monitoring section 17.

In the base station control equipment described above, the transmission rate as the reference of the increase/decrease of transmitting power is given by the mobile station 12 that executes hand-off, and the channel controlling section 13 need not manage and recognize the transmission rate during its channel control.

In consequence, channel control efficiency can be improved, and the mobile station 12 can independently identify or manage the transmission rate of the transmission information to be received by the local station during the channel control process.

The principle of the eleventh base station control equipment according to the invention is as follows.

A channel allotting section forms a new visit-zone of the mobile station, and allots a downstream communication channel to be formed between each mobile station and the radio base station to the radio base station that executes transmitting power control of downstream communication information to be transmitted to the mobile station according to the signal received from the mobile station. The channel controlling section updates transmitting power of the downstream communication channel from an initial value to a greater value.

In this instance, the channel controlling section is disposed in the base station control equipment to instruct gradual updating of transmitting power to the radio base station.

In the base station control equipment described above, transmitting power of the downstream communication channel, that is transmitted by the radio base station forming the new visit-zone of by the mobile station to this mobile station, becomes progressively greater after the transmission is started.

Therefore, although the distance between the radio base station forming the new visit-zone and the mobile station is not always constant, interference and jamming resulting from excess of transmitting power can be suppressed or avoided more than in the prior art example in which the value of transmitting power is set in advance to a predetermined value.

Hereinafter, the principle of the radio base station equipment according to the invention will be explained with reference to FIG. 2.

Figure 2:
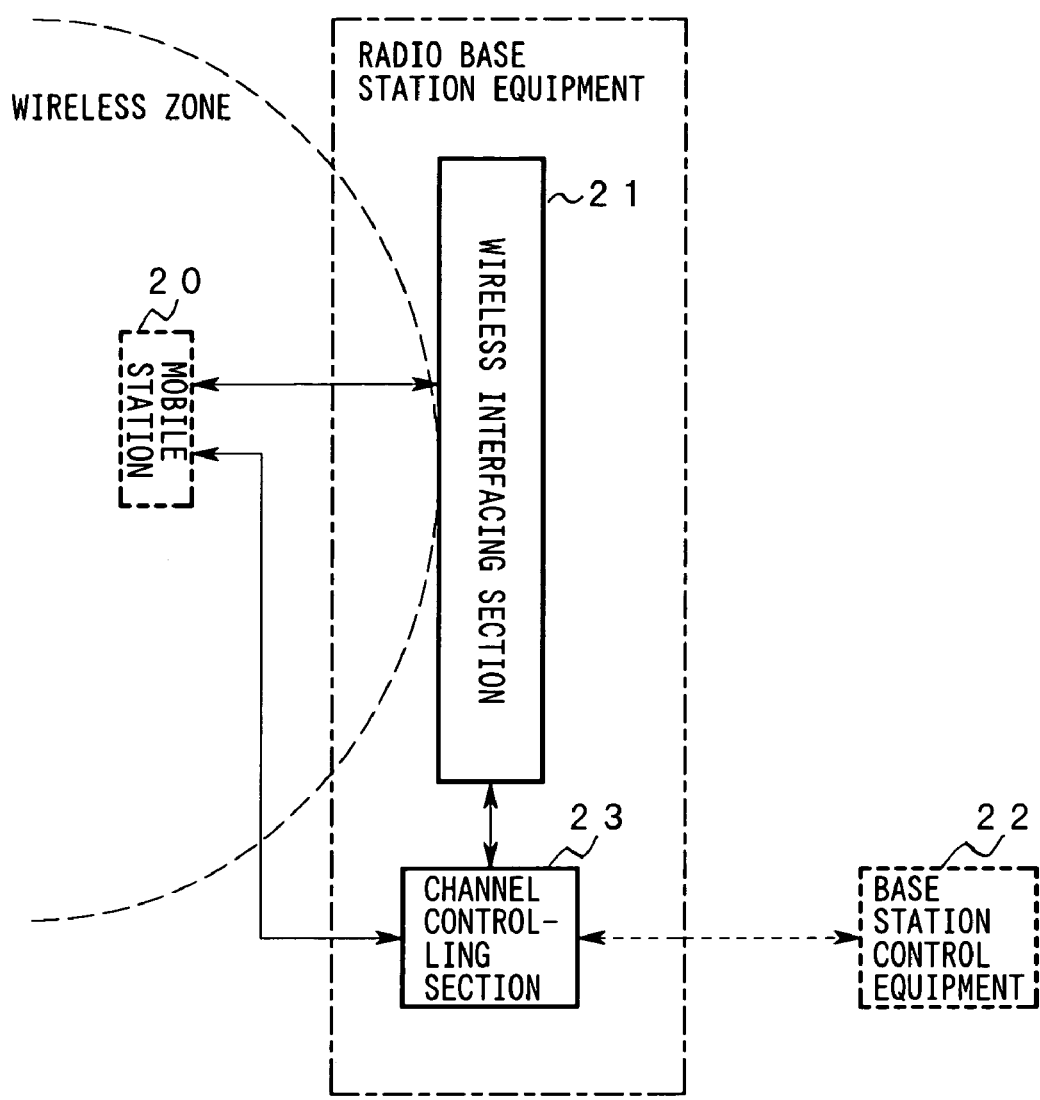
FIG. 2 is a block diagram showing the principle of radio base station equipment according to the invention.

FIG. 2 is a block diagram showing the principle of the radio base station equipment according to the invention.

The radio base station equipment shown in FIG. 2 includes wireless interfacing section 21 for forming a radio transmission channel to a mobile station situated in the wireless zone formed by the local station, and a channel controlling section 23 in cooperation with the wireless interfacing section 21 and a base station controller 22.

The principle of the first radio base station equipment according to the invention is as follows.

The wireless interfacing section 21 forms a wireless zone in an area in which the mobile station 20 can be situated, and matches the wireless zone with transmission information to be transmitted/received by the mobile station. The channel controlling section 23 cooperates with the base station controller 22 and executes channel control of the wireless zone formed by the wireless interfacing section 21 under the initiative of the base station controller 22. Furthermore, the channel controlling section 23 updates transmitting power of the radio channel allotted anew to the mobile station 20 to a greater value in order of time sequence when the wireless zone formed by the local station corresponds to the new visit-zone of the completed call occurring in the mobile station or the candidate for the new visit-zone.

When the local station corresponds to the radio base station that forms the new visit-zone of the mobile station 20 in the radio base station equipment, a value of transmitting power of the transmission wave transmitted to the radio base station 20 becomes greater in order of time sequence after the transmission is started.

In consequence, although the relative distance from the mobile station 20 is not always constant, interference and jamming resulting from excess of transmitting power can be suppressed or avoided more than in the prior art example in which the value of transmitting power is set in advance to a predetermined value.

The principle of the second radio base station equipment according to the invention is as follows.

The channel controlling section 23 independently obtains both or either of a time point at which transmitting power of the radio channel allotted anew is updated and/or an increment to which transmitting power is to be updated at this time point.

In the radio base station equipment described above, transmitting power is set by the exchange of the messages with the base station controller 22 or the mobile station 20 not by cooperating, and is updated to a greater value in order of time sequence.

Consequently, channel control efficiency can be maintained at a high level, and unnecessary interference and jamming resulting from excess of transmitting power of the transmission wave transmitted by the radio base station forming the new visit-zone can be suppressed or avoided.

The principle of the third radio base station equipment according to the invention is as follows.

When transmission of the radio channel allotted anew is started, the channel controlling section 23 notifies the start to the mobile station 20, and updates transmitting power of this radio channel every time it receives the response to this notice from the mobile station 20.

In this radio base station equipment, updating of transmitting power is suspended until transmission quality of the radio transmission channel formed with the mobile station 12 reaches a level at which it can receive the response.

In consequence, although the relative distance from the mobile station is short, the occurrence of interference and jamming resulting from the unnecessary increase of transmitting power can be avoided even when transmission quality of the radio transmission channel formed to the mobile station falls to a low level in accordance with the occurrence of loss and multi-path resulting from the distribution of landform and planimetry.

The principle of the fourth radio base station equipment according to the invention is as follows.

The wireless interfacing section 21 forms the wireless zone in an area in which the mobile station 20 can be situated and matches the wireless zone with transmission information to be transmitted/received by the mobile station 20. The channel controlling section 23 cooperates with the base station controller 22 and executes channel control relating to the wireless zone formed by the wireless interfacing section 21 under the initiative of the base station controller 22. Further, the-channel controlling section 23 notifies transmitting power of the individual radio channels where transmission is executed in the wireless zone formed by the local station through the wireless interfacing section 21, to the base station controller 22.

In the radio base station equipment described above, transmitting power can be employed for the computation of transmitting power of the radio channel to be transmitted anew to the new visit-zone even when the local station forms the wireless zone to the former visit-zone or the new visit-zone.

Therefore, the base station controller 22 need not recognize transmitting power of the radio channel where transmission is executed in each radio base station, so as to compute such transmitting power.

The principle of the fifth radio base station equipment according to the invention is as follows.

The wireless interfacing section 21 forms the wireless zone in an area in which the mobile station 20 can be situated, and matches the wireless zone with transmission information to be transmitted/received by the mobile station 20. The channel controlling section 23 cooperates with the base station controller 22, and executes channel control relating to the wireless zone formed by the wireless interfacing section 21 under the initiative of the base station controller 22. Further, the channel controlling section 23 notifies to the base station controller 22 the level of the reception wave notified from the mobile station 20 through the wireless interfacing section 21 and reaches the mobile station 20 through the radio channel not transmitted by the local station.

In the radio base station equipment described above, transmitting power is given by the mobile station 20, and can be used for the computation of transmitting power of the radio channel that is to be transmitted anew to the radio channel where transmission is executed in each radio base station.

Therefore, the base station controller 22 need not recognize transmitting power of the radio channel where each radio base station executes transmission, so as to compute transmitting power.

The principle of the sixth radio base station equipment according to the invention is as follows.

The wireless interfacing section 21 forms a wireless zone in an area in which the mobile station 20 can be situated, and matches the wireless zone with transmission information to be transmitted/received by the mobile station 20. The channel controlling section 23 cooperates with the base station controller 22 and executes channel control relating to the wireless zone formed by the wireless interfacing section 21 under the initiative of the base station controller 22. The channel controlling section 23 notifies to the base station controller 22 the transmission rate of the transmission information which is to be transmitted to the mobile station 20 through the wireless interfacing section 21 and is to be received by the mobile station 20.

In the radio base station equipment described above, the transmission rate can be used for the computation of a proper value of transmitting power of the radio channel to be anew transmitted to the new visit-zone to which the mobile station 20 executes transmission.

Therefore, the base station controller 22 need not grasp transmitting power of the radio channel where transmission is executed in parallel, so as to compute the proper value of transmitting power.

The principle of the seventh radio base station equipment according to the invention is as follows.

The wireless interfacing section 21 forms a wireless zone in an area in which the mobile station 20 can be situated, and matches the wireless zone with transmission information to be transmitted/received by the mobile station 20. The channel controlling section 23 cooperates with the base station controller 22 and executes channel control relating to the wireless zone formed by the wireless interfacing section 21 under the initiative of the base station controller 22. Further, the channel controlling section 23 notifies to the base station controller 22 the transmission rate of the transmission information that is notified from the mobile station 20 through the wireless interfacing section 21, is transmitted by the wireless interfacing section 21 and is to be received by the mobile station 20.

In the radio base station equipment described above, the transmission rate can be used for the computation of a proper value of transmitting power of the radio channel to be anew transmitted to the new visit-zone to which the mobile station 20 executes transmission.

Therefore, the base station controller 22 need not grasp transmitting power of the radio channel where transmission is executed in parallel, in order to compute the proper value of such transmitting power.

The principle of the eighth radio base station equipment according to the invention is as follows.

A transmitting power controlling section executes transmitting power control of a downstream communication information to be transmitted to the mobile station in accordance with the signal received from the mobile station. The channel controlling section updates transmitting power of the communication channel that is allotted to the mobile station in a hand-off process, from the initial value to a greater value.

In the radio base station equipment described above, unnecessary interference and jamming resulting from excess of transmitting power can be suppressed or avoided compared to the prior art example in which the value of transmitting power is set in advance to a predetermined value, although the distance between the radio base station forming the new visit-zone and the mobile station is not always constant.

The principle of the ninth radio base station equipment according to the invention is as follows.

Prior to the point at which transmitting power control is started according to the signal received from the mobile station, the channel controlling section stops updating transmitting power either at the point at which a predetermined time passes from the start of transmission of the communication channel or at the point at which transmitting power of the communication channel reaches a predetermined value.

The predetermined value described above can be preferably gradually updated while transmitting power of the communication channel allotted by the radio base station forming the new visit-zone to the mobile station is limited to a value smaller than an allowable value of the system (for example, $P_T$ of the aforementioned formula 1).

In the radio base station equipment described above, although the distance between the radio base station forming the new visit-zone to which the mobile station is to execute transmission during the hand-off process, and the mobile station, is not always constant, unnecessary interference and jamming resulting from excess of transmitting power can be suppressed or avoided compared to the prior art example in which the value of transmitting power is set in advance to a predetermined value.

Next, the principle of radio terminal equipment according to the invention will be explained with reference to FIG. 3.

Figure 3:
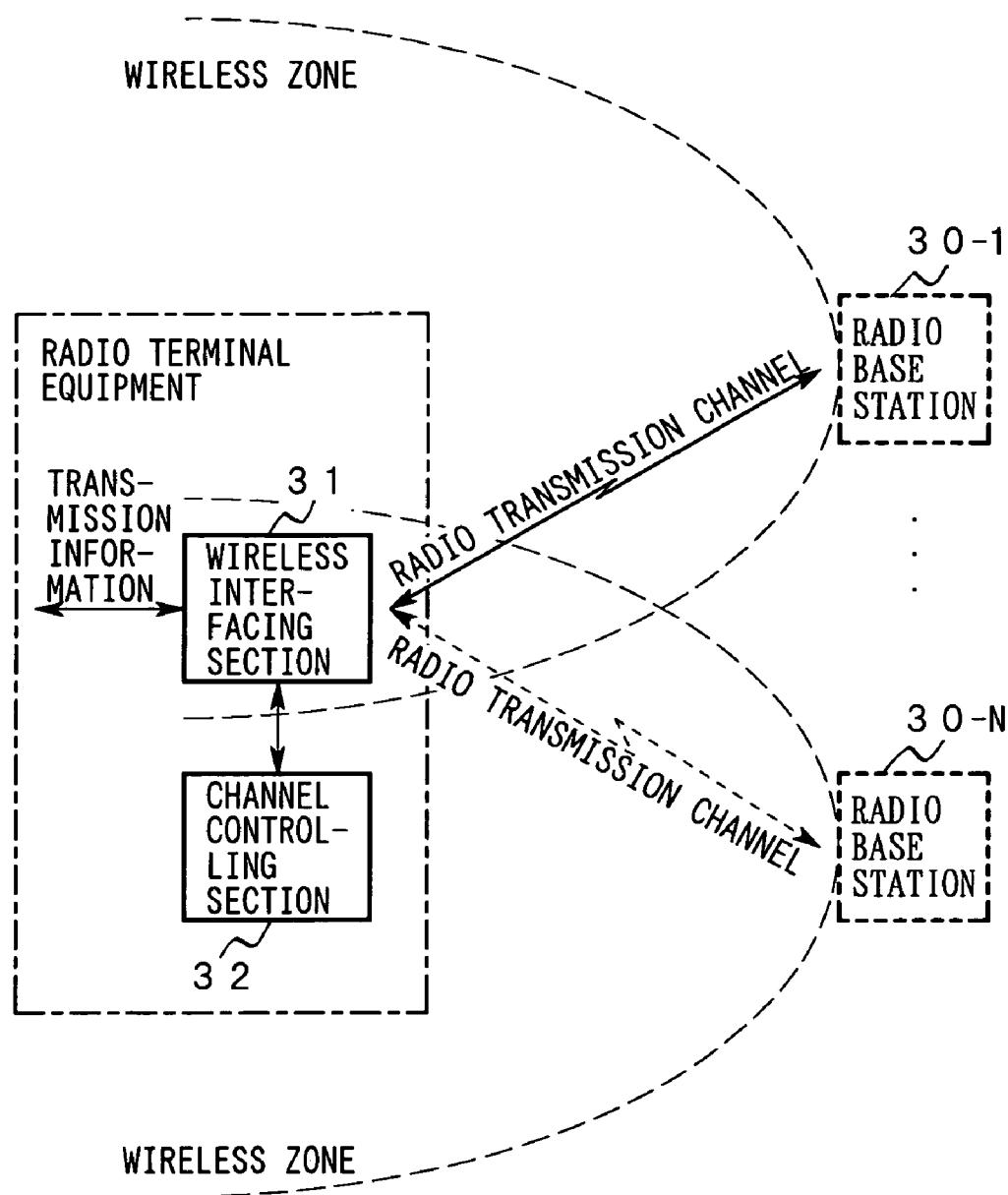
FIG. 3 is a block diagram showing the principle of radio terminal equipment according to the invention.

FIG. 3 is a block diagram useful for explaining the principle of the radio terminal equipment according to the invention.

The radio terminal equipment shown in FIG. 3 includes radio base stations 30-1 to 30-N, a wireless interfacing section 31 in cooperation with these radio base stations through radio transmission channels and a channel controlling section 32.

The principle of the first radio terminal equipment according to the invention is as follows.

The wireless interfacing section 31 forms the radio transmission channel with any of a plurality of radio base stations 30-1 to 31-N individually forming the wireless zones, and transmits and receives the transmission information through the radio transmission channel. The channel controlling section 32 cooperates with the radio base stations 30-1 to 30-N through the wireless interfacing section 31 and the radio transmission channel formed by the wireless interfacing section 31, and executes channel control of a call occurring in the local station. The channel controlling section 32 monitors transmission quality of a down link of the new visit-zone during a period in which a completed call occurring inside the local station continues to exist. When transmission quality is below a predetermined threshold value, the channel controlling section 32 sends response to the radio base station forming the new visit-zone among the radio base stations 31-1 to 31-N through the wireless interfacing section 31.

In such radio terminal equipment, the response described above signifies the time point at which transmitting power of the radio channel allotted to the radio terminal equipment according to the invention, and the candidate for the new visit-zone to which the radio terminal equipment is to transit, or the radio base station forming the new visit-zone is to perform transmission, is to be updated.

As to such transmitting power, the radio terminal equipment can avoid updating either independently or without cooperating with the radio terminal equipment according to the invention.

The principle of the second radio terminal equipment according to the invention is as follows.

The wireless interfacing section 31 forms a radio transmission channel to any of a plurality of radio base stations 30-1 to 31-N individually forming the wireless zones, and transmits and receives the transmission information through the radio transmission channel. The channel controlling section 32 cooperates with the radio base stations 30-1 to 30-N through the wireless interfacing section 31 and the radio transmission channel formed by the wireless interfacing section 31, and executes channel control of a call occurring in the local station. The channel controlling section 32 monitors transmission quality of the down link of the new visit-zone during a period in which the completed call occurring in the local station continues to exist. When transmission quality is below a predetermined threshold value, the channel controlling section 32 sends the response to the radio base station forming the former visit-zone among the radio base stations 31-1 to 31-N through the wireless interfacing section 31.

In this radio terminal equipment, the response described above can be quickly transmitted with higher probability to the radio base station forming the former visit-zone or to the base station controller disposed as the higher-rank office to the radio base stations compared to the case where the response is transmitted through the radio base station that forms the new visit-zone or the candidate for the new visit-zone.

Therefore, even when the relative distance from the radio base station forming the new visit-zone is long, a continuity test or a process for determining the radio base station as the radio base station that forms the new visit-zone can be quickly executed in cooperation with this radio base station.

The principle of the third radio terminal equipment according to the invention is as follows.

The wireless interfacing section 31 forms a radio transmission channel with any of a plurality of radio base stations 30-1 to 30-N forming individually the wireless zones, and transmits and receives the transmission information. The channel controlling section 32 cooperates with the radio base stations 30-1 to 30-N through the wireless interfacing section 31 and through the radio transmission channel formed by the wireless interfacing section 31, and executes channel control of a call occurring in the local station. The channel controlling section 32 monitors transmission quality of the down link of the new visit-zone during a period in which the completed call occurring in the local station continues to exist, and notifies this transmission quality to the radio base station forming the former visit-zone among the radio base stations 31-1 to 31-N.

In this radio terminal equipment, transmission quality described above can be employed for the computation of transmitting power at which transmission is to be executed to the radio channel allotted anew to the new visit-zone.

Therefore, the radio base station forming the new visit-zone or the base station controller disposed as the higher-rank office to the radio base stations can compute transmitting power with reliability according to transmission quality of the new visit-zone that is substantially obtained by the radio terminal equipment of the invention.

The principle of the fourth radio terminal equipment according to the invention is as follows.

The wireless interfacing section 31 forms a radio transmission channel with any of a plurality of radio base stations 30-1 to 30-N forming individually the wireless zone, and transmits and receives the transmission information through the radio transmission channel. The channel controlling section 32 cooperates with the radio base stations 30-1 to 30-N through the wireless interfacing section 31 and the radio transmission channel formed by the wireless interfacing section 31, and executes channel control of a call occurring in the local station. The channel controlling section 32 obtains the transmission rate of transmission information to be received through the down link in the wireless zone visited by the mobile station during the period in which the completed call occurs in the local station or the completed call continues to exist, and notifies the transmission rate to the radio base station that forms this wireless zone among the radio base stations 31-1 to 30-N.

In the radio terminal equipment described above, the transmission rate described above can be used for the computation of transmitting power at which transmission is to be executed to the radio channel allotted anew to the new visit-zone.

Therefore, the radio base station forming the new visit-zone or the base station controller disposed as the higher-rank office to the radio base stations can compute transmitting power with higher probability according to the transfer rate determined by the radio terminal equipment of the invention.

The principle of the first mobile communication system according to the invention is as follows.

The first mobile communication system according to the invention includes a first radio base station, a second radio station and radio base station control equipment for setting communication channels of these first and second radio base stations. A channel controlling section gradually updates from an initial value to a greater value, transmitting power of a downstream communication channel of a mobile station to be set to the second radio base station up to the time point at which transmitting power control is made in accordance with a signal received from the mobile station during the process in which the mobile station communicating with the first radio base station hands off the communication to the second radio base station.

The channel controlling section may be installed inside each radio base station and may autonomously control transmitting power of the signal to be transmitted to the mobile station. Alternatively, the channel controlling section may comprise a plurality of means whose functions are dispersed to the base station control equipment and to the radio base station in the following forms, for example.

Means provided to the base station control equipment transmits an instruction signal signifying updating of transmitting power of the signal to be transmitted to the mobile station to a greater value, to the radio base station.

Means provided to the radio base station receives this instruction signal and increases transmitting power in accordance with this instruction signal.

As to the channel control, a processing for transmitting the instruction signal described above in the base station control equipment may be combined with a processing for receiving the instruction signal in the radio base station so as to realize a processing for updating transmitting power to a greater value in accordance with the instruction signal.

In other words, the functions and loads of the channel controlling section may be dispersed in any form so long as the downstream communication signal transmitted from the radio base station to the mobile station (such as speech, data and other signals) can be updated to a greater value.

In the mobile communication system described above, transmitting power of the downstream communication channel transmitted by the radio base station forming the new visit-zone of the mobile station to the mobile station becomes gradually a greater value after the start of transmission.

Therefore, although the distance between the radio base station forming the new visit-zone and the mobile station is not always constant, unnecessary interference and jamming resulting from excess of transmitting power can be suppressed or avoided compared to the prior art example in which the value of transmitting power is set in advance to the predetermined value.

The principle of the second mobile communication system according to the invention is as follows.

The second radio base station executes transmitting power control of the downstream communication signal to be transmitted to a mobile station according to the signal received from the mobile station communicating with the first radio base station. The radio base station control equipment executes channel control of the first and second radio base stations. When the second radio base station is selected as the radio base station forming the new visit-zone of the mobile station and communication of the downstream communication signal is started from this second radio base station to the mobile station, a notifying section notifies the start of transmission to the mobile station through the first radio base station. A receiving section receives the response transmitted from the mobile station responding to this notice. The channel controlling section judges whether or not to increase transmitting power of the downstream communication signal according to the response received. When the judgment result is true, the channel controlling section updates transmitting power to a high value within a predetermined level.

In the mobile communication system described above, the radio base station forming the new visit-zone suspends updating of transmitting power until transmission quality of the radio transmission channel formed to the mobile station reaches a satisfactory level to receive the response described above.

Therefore, although the distance is short between the radio base station forming the new visit-zone and the mobile station, the occurrence of interference and jamming resulting from the unnecessary increase of transmitting power can be avoided even when transmission quality of the radio transmission channel drops in accordance with the occurrence of the loss and multi-path resulting from the distribution of landform and planimetry.

The principle of the third mobile communication system according to the invention is as follows.

The base radio station executes transmitting power control of the downstream communication information to be transmitted to a mobile station in accordance with the signal received from the mobile station, and the local station and a periphery base station receive the state notice representing the state of the signal received from the mobile station. The channel controlling section obtains the difference of propagation loss between a signal received by the radio base station forming the former visit-zone and a signal received by the radio base station forming the new visit-zone according to the state notice at the time of hand-off. The channel controlling section sets an initial value of transmitting power of the downstream communication information to be transmitted by the radio base station forming the new visit-zone according to the difference and a value of the transmitting power of the downstream communication information transmitted by the radio base station forming the former visit-zone, and updates this transmitting power from the initial value to a greater value.

In such a mobile communication system, even when the base station and the base station controller do not manage and recognize transmitting power described above, transmitting power at which the radio base station forming the new visit-zone is to transmit the radio channel allotted anew is set to a proper value suitable for substantial transmission characteristics of the radio transmission channel formed between the radio base station and the mobile station.

In consequence, the load to channel control to be made by the base station controller can be mitigated, and the radio base station can flexibly manage transmitting power of the radio channel to be transmitted in parallel by the location station as channel control.

The principle of the fourth mobile communication system according to the invention is as follows.

The radio base station executes transmitting power control of the downstream communication information to be transmitted to a mobile station in accordance with the signal received from the mobile station, and the periphery base station receives the state notice representing the state of the signal received from the mobile station. The channel controlling section obtains the propagation loss of the transmission channel between the mobile station and the radio base station that forms new visit-zone, and sets the initial value of transmitting power to be transmitted from this radio base station to the mobile station while taking this propagation loss into account.

In the mobile communication system described above, transmitting power of the radio channel at which the radio base station forming the new visit-zone is to start a new transmission is set to a value for compensating the substantial transmission loss of the radio transmission channel formed between the radio base station and the mobile station.

The information content that the mobile station determines on the basis of the procedure of channel control and that is to be applied to the computation of the initial value described above becomes a small value.

Therefore, hardware and software to be mounted to the mobile station can be reduced in scale, and the initial value can be obtained with high accuracy. Furthermore, channel control efficiency relating to hand-off can be improved, and the occurrence of interference and jamming resulting from unnecessary excess of transmitting power can be avoided.

Hereinafter, preferred embodiments of the invention will be explained in detail with reference to the accompanying drawings.

Figure 4:
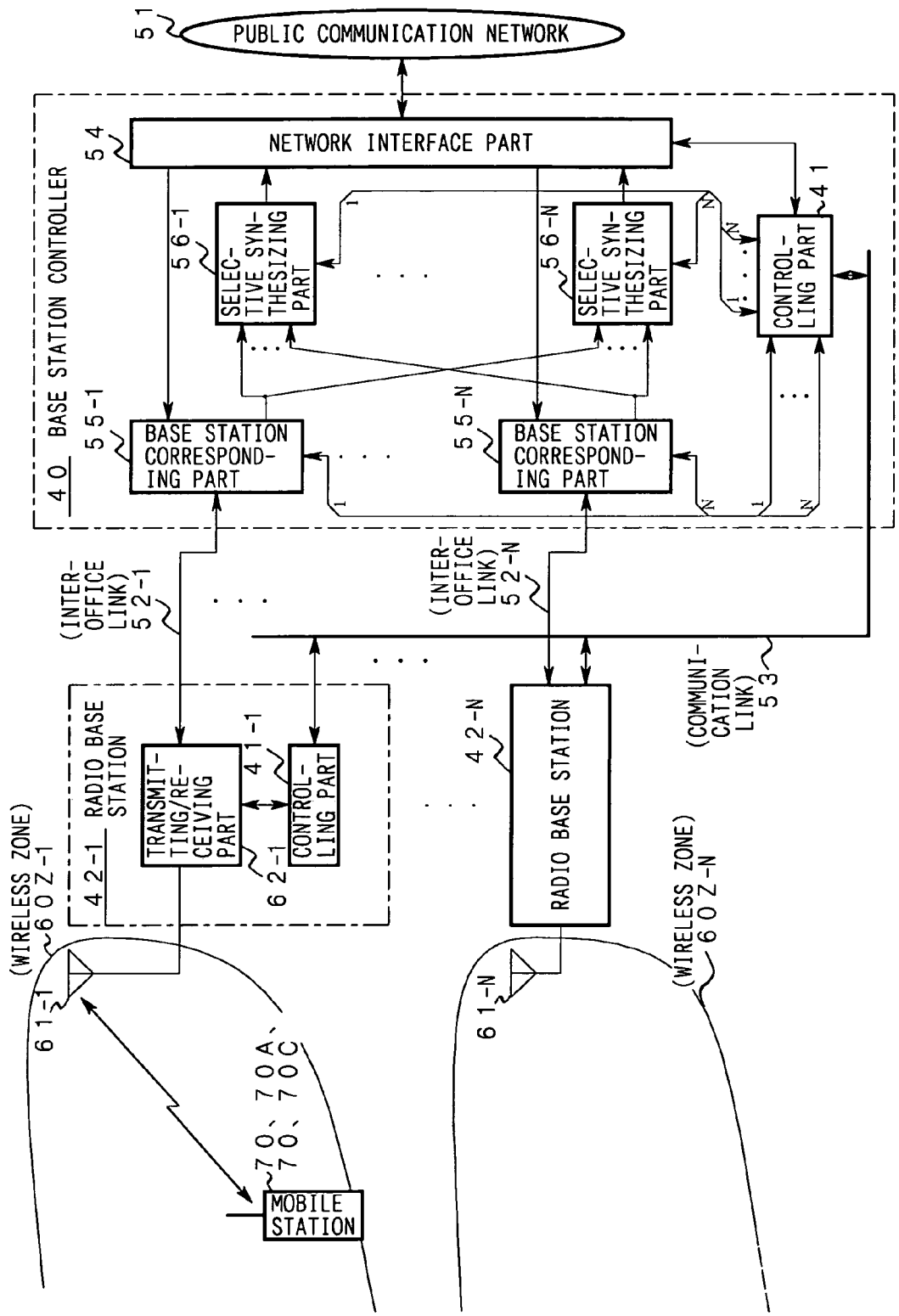
FIG. 4 shows an embodiment of the invention.

FIG. 4 shows an embodiment of the invention.

In the drawing, like reference numerals are used to identify like constituents having the same function and construction, and explanation of such constituents will be omitted.

The structural difference of this embodiment from the prior art example shown in FIG. 20 is that a base station controller 40 is provided in place of the base station controller 50 and radio base stations 42-1 to 42-N are provided in place of the radio base stations 60-1 to 60-N.

The structural difference of the base station controller 40 from the base station controller 50 shown in FIG. 20 is that a controlling part 41 is provided in place of the controlling part 57.

The structural difference of the radio base station 42-1 from the radio base station 60-1 is that a controlling part 43-1 is provided in place of the controlling part 63-1.

Since the construction of each radio base station 42-2 to 42-N is the same as that of the radio base station 42-1, suffixes "2" to "N" will be put to the corresponding constituents and their explanation and illustration in the drawings will be omitted.

Figure 5:
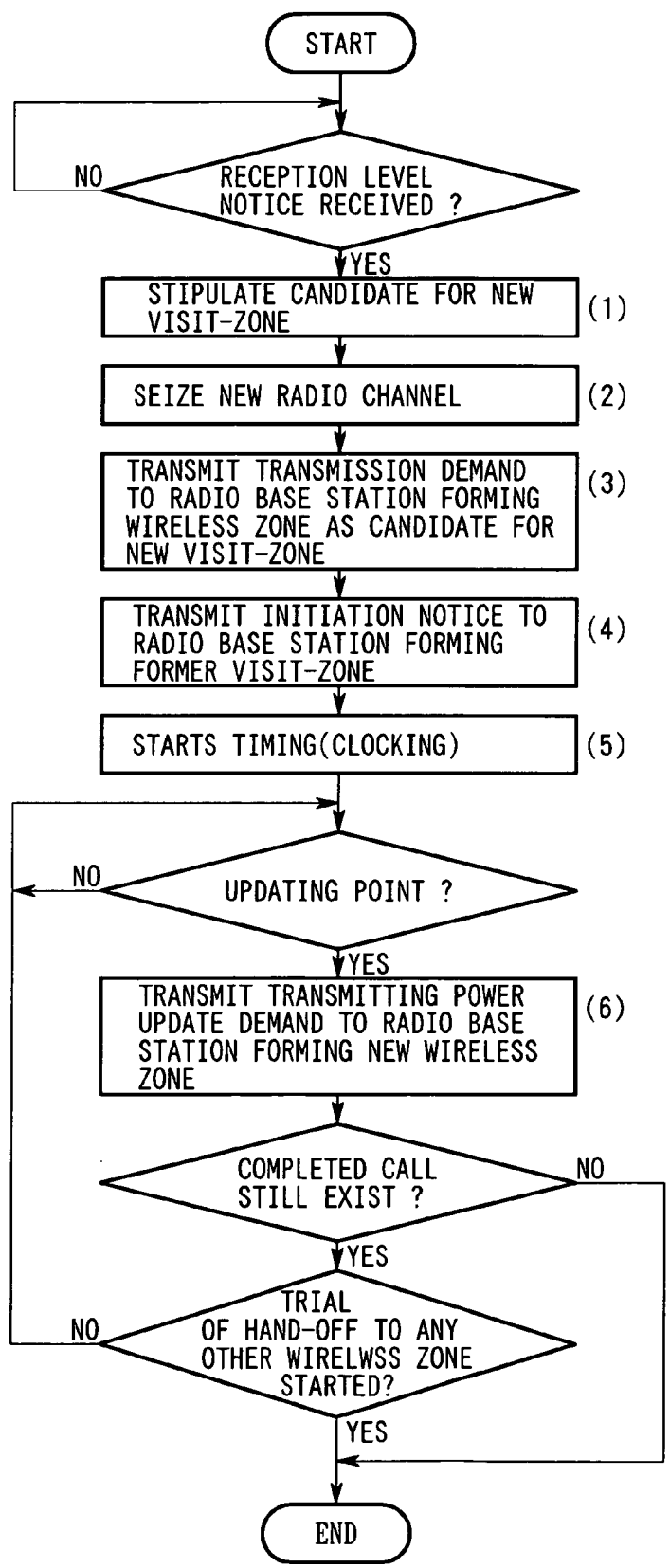
FIG. 5 shows an operation flowchart of the first embodiment of the invention.

FIG. 5 is an operation flowchart of the first embodiment of the invention.

Figure 6:
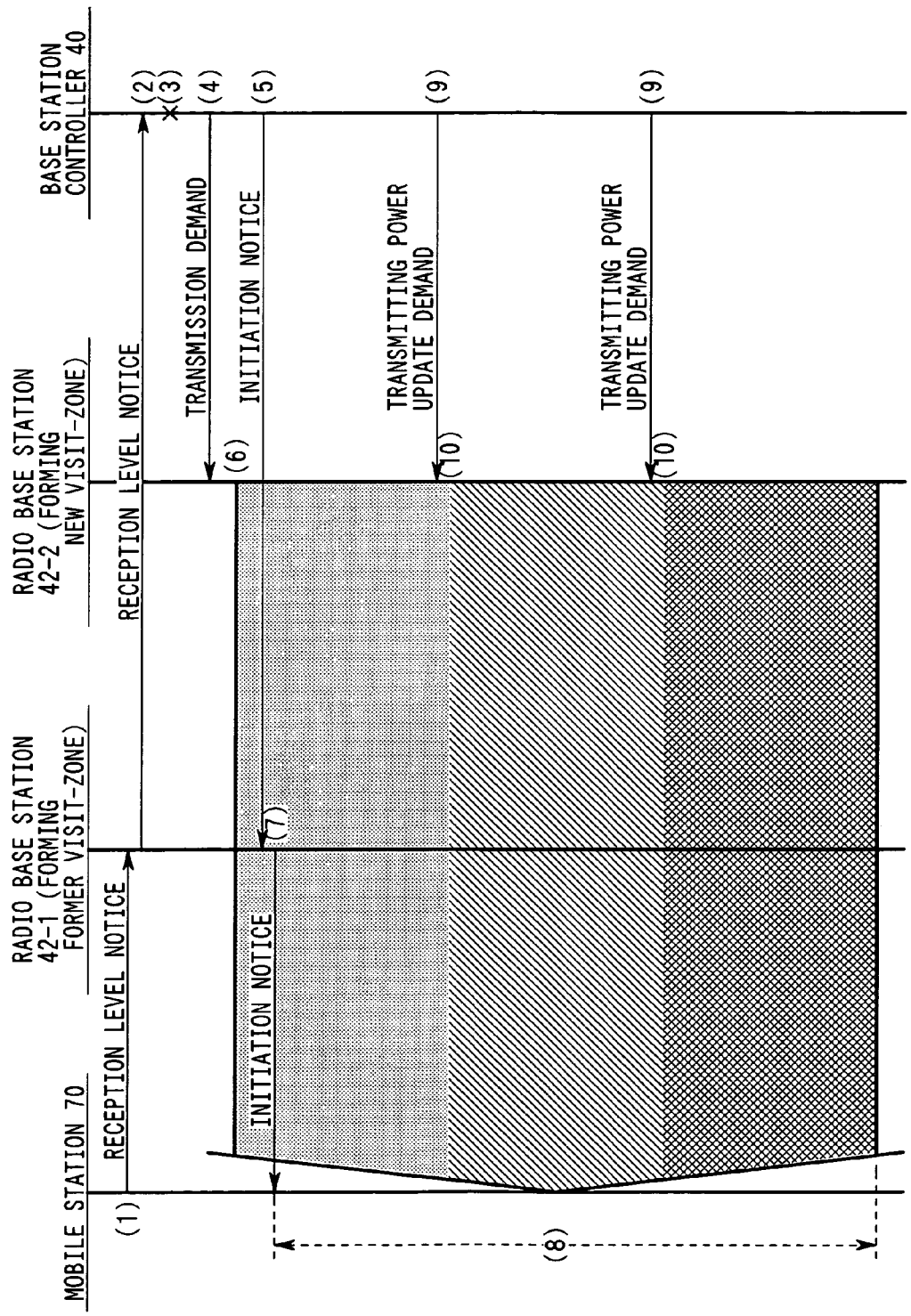
FIG. 6 is a view useful for explaining the operation of the first embodiment of the invention.

FIG. 6 is a view useful for explaining the operation of the first embodiment.

Next, the operation of the first embodiment of the invention will be explained with reference to FIGS. 4 to 6.

In each of the following embodiments, only the hand-off process will be explained specifically on the assumption that the following conditions (1) to (3) are established.

(1) A call occurring in a mobile station 70 becomes a completed call and still pertains.

(2) The mobile station 70 is moving from the area in which a wireless zone 60Z-1 (hereinafter called the "former visit-zone") and a wireless zones 60Z-2 (hereinafter called the "new visit-zone") overlap with each other to the new visit-zone.

(3) In the new visit-zone, no factor exists that hinders allotment of a new radio channel to the mobile station 70.

Explanation of a channel controlling processing, that is to be executed in cooperation with each part of the base station controller 40, the radio base station 42-1 and the mobile station 70 during the process in which the call occurring in the mobile station 70 becomes the completed call, is omitted.

The mobile station 70 measures a level $L_{dr1}$ of the reception wave reaching the local station from the radio base station 42-1 (which is hereby assumed as the speech channel allotted to the local station, for the sake of simplicity), and transmits a reception level notice (as an example of the state notice; FIG. 6(1))inclusive of the level $L_{dr1}$ to the radio base station 42-1.

The reception level notice will be assumed hereby for simplicity as including an identifier of the mobile station 70 as the transmitting party, identification information of a radio base station 42-1 forming a wireless zone 60Z-1 in which the mobile station 70 visits and identification information of a radio base station forming a wireless zone adjacent to the wireless zone 60Z-1.

In the radio base station 42-1, the controlling part 41-1 receives this reception level notice through an antenna 61-1 and a transmitting/receiving part 62-1, and transfers this reception level notice to the base station controller 40 through the communication link 53.

In the base station controller 40, the controlling part 41 identifies this reception level notice (FIG. 6(2)) and stipulates the candidate for the new visit-zone to which the mobile station 70 transits during the hand-off process, by executing a predetermined processing either by itself or through cooperation with radio base stations among the base stations 421 to 42-N other than the radio base station 42-1 reed by the identification information contained in the reception level notice (FIGS. 5(1) and 6(3)).

Incidentally, the candidate for such a new visit-zone is hereby assumed as the wireless zone 60-2 for simplicity.

The controlling part 41 executes a predetermined processing, seizes any radio channel (hereinafter called the "new channel") among vacant radio channels of the new visit-zones (FIG. 5(2)) and sends a transmission demand, that instructs to start transmission of the new channel, to the radio base station 42-2 forming the wireless zone 60Z-2 as the candidate for the new visit-zone described above (FIGS. 5(3) and 6(4)).

After sending this transmission demand, the controlling part 41 generates an initiation notice that indicates sending of this transmission demand and contains the channel identifier of the new channel, and sends the initiation notice to the radio base station 42-1 read by the identification information described above through the communication link 53 (FIGS. 5(4) and 6(5)).

In the radio base station 42-2, on the other hand, the controlling part 41-2 uses transmitting power that satisfies the following conditions for the radio channel through which transmission is started, as the new channel.

Interference occurring in the radio transmission channel from the radio base station other than the radio base station 42-2 to the mobile station located in a close range of this radio base station 42-2 is small and below a rated threshold value.

The transmitting power is large to such a degree that the mobile station 70 located in the proximity of the radio base station 42-2 can complete its transition to the new visit-zone formed by the radio base station 42-2.

Identifying the transmission demand, the controlling part 41-2 starts transmitting to the new channel at transmitting power equal to the initial value described above (FIG. 6(6)).

The radio base station 42-1 identifies the initiation notice described above, and transfers the initiation notice to the mobile station 70 (FIG. 6(7)).

Identifying the initiation notice, the mobile station 70 executes a predetermined processing necessary for applying the new channel represented by the channel identifier contained in the initiation notice as a substitute speech channel (FIG. 6(8)).

In the base station controller 40, the controlling part 41 starts counting the time with the point at which the initiation notice is sent as the start point (FIG. 5(5)), and sends to the radio base station 42-2 a transmitting power update demand, meaning that transmitting power of the new channel is to be updated, whenever a predetermined time (hereinafter called an "updating point" which needs not always be constant) expires (FIGS. 5(6) and 6(9)).

Incidentally, the transmitting power update demand may contain information representing the increment to which transmitting power of the new visit-zone channel is to be updated.

Whenever transmitting power of the new channel is given, the radio base station 42-2 updates transmitting power of the new channel to a predetermined large value (or a large value covering the increment contained in the transmitting power update demand).

According to this embodiment, transmitting power of the new channel is gradually increased from the initial value to a large value as described above. Therefore, compared to the prior art example in which transmitting power is set in advance to a predetermined value, this embodiment can more flexibly cope with fluctuation of the transmission characteristics resulting from the change of the distribution of landform and planimetry in the wireless zones 60Z-1 to 60Z-N or from other factors, and with the zone configurations. Furthermore, this embodiment can avoid the occurrence of unnecessary interference with the down links.

Incidentally, the controlling part 41 provided to the base station controller 40 measures the time as described above.

However, the time measuring may be carried out by the radio base station forming the new visit-zone among the radio base stations 42-1 to 42-N may measure the time.

Such time measuring may be substituted with a necessary time of an arithmetic operation executed on the basis of a predetermined algorithm as long as transmitting power of the new channel or the increment of such transmitting power is given with desired accuracy in order of time sequence.

In this embodiment, the controlling part 41 provided to the base station controller 40 gives the increment described above.

However, such an increment may be given by the radio base station or may be set to a predetermined value.

In this embodiment, the information source of the updating point and the increment is not given concretely.

These updating time and increment may be given in advance as office data dispersed to the base station controller 40 and to the radio base stations 42-1 to 42-N, and may be updated appropriately in accordance with the office establishment condition of these stations.

This embodiment does not at all describe concrete values of the updating time and the increment.

Figure 7:
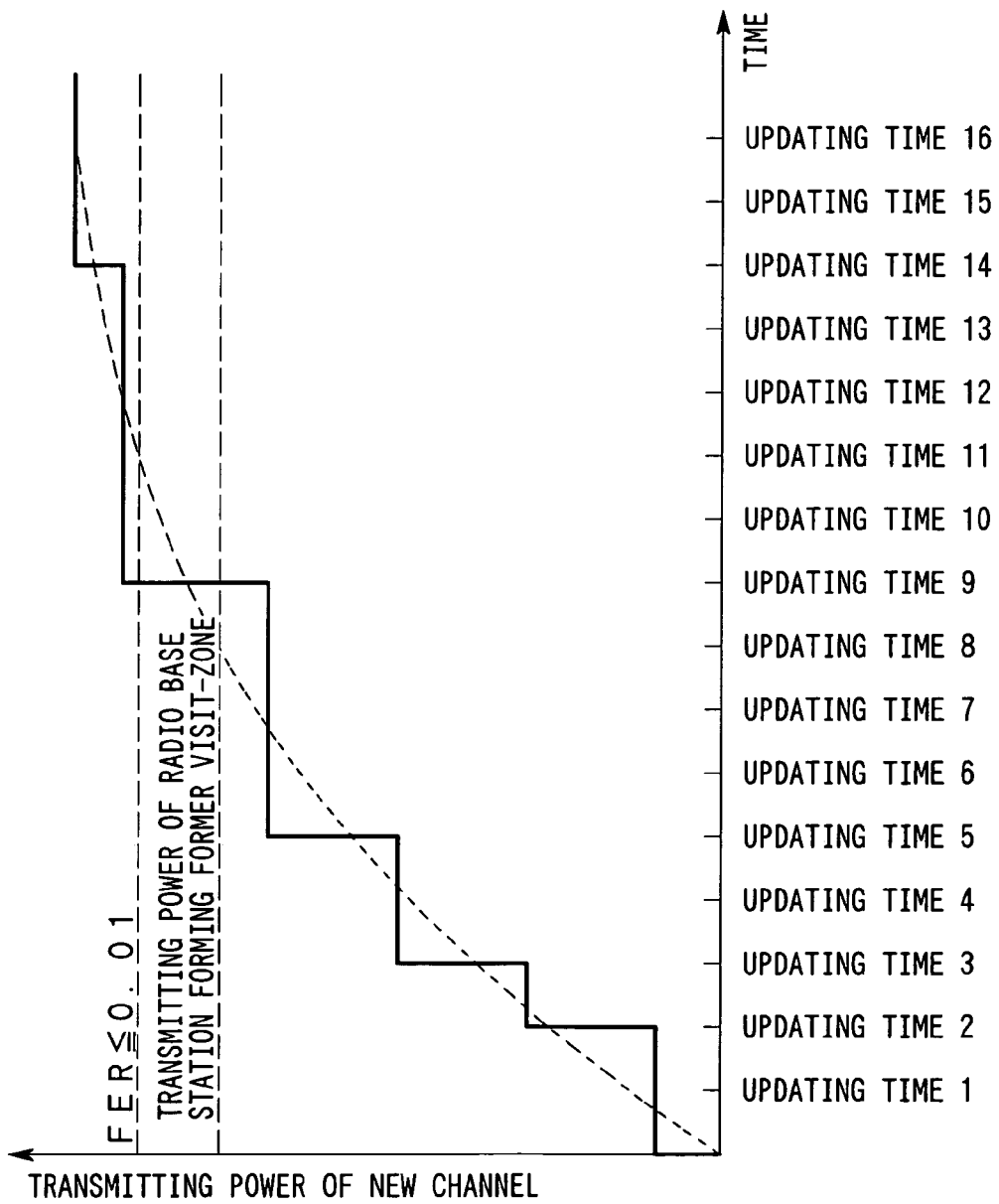
FIG. 7 is a view (1) showing transmitting power of a new channel in the embodiment of the invention.

So long as desired service quality can be secured and the running cost can be reduced, however, these updating point and increment may be given as desired time functions such that transmitting power of the new visit-zone exceeds transmitting power of a specific radio channel transmitted by the radio base station 42-1 forming the former visit-zone to the mobile station 70 as it is serially updated in a short interval as shown in FIG. 7, and a frame error rate FER represented by the reception wave reaching the mobile station 70 through the new channel exceeds a lower limit value (=0.01).

Figure 8:
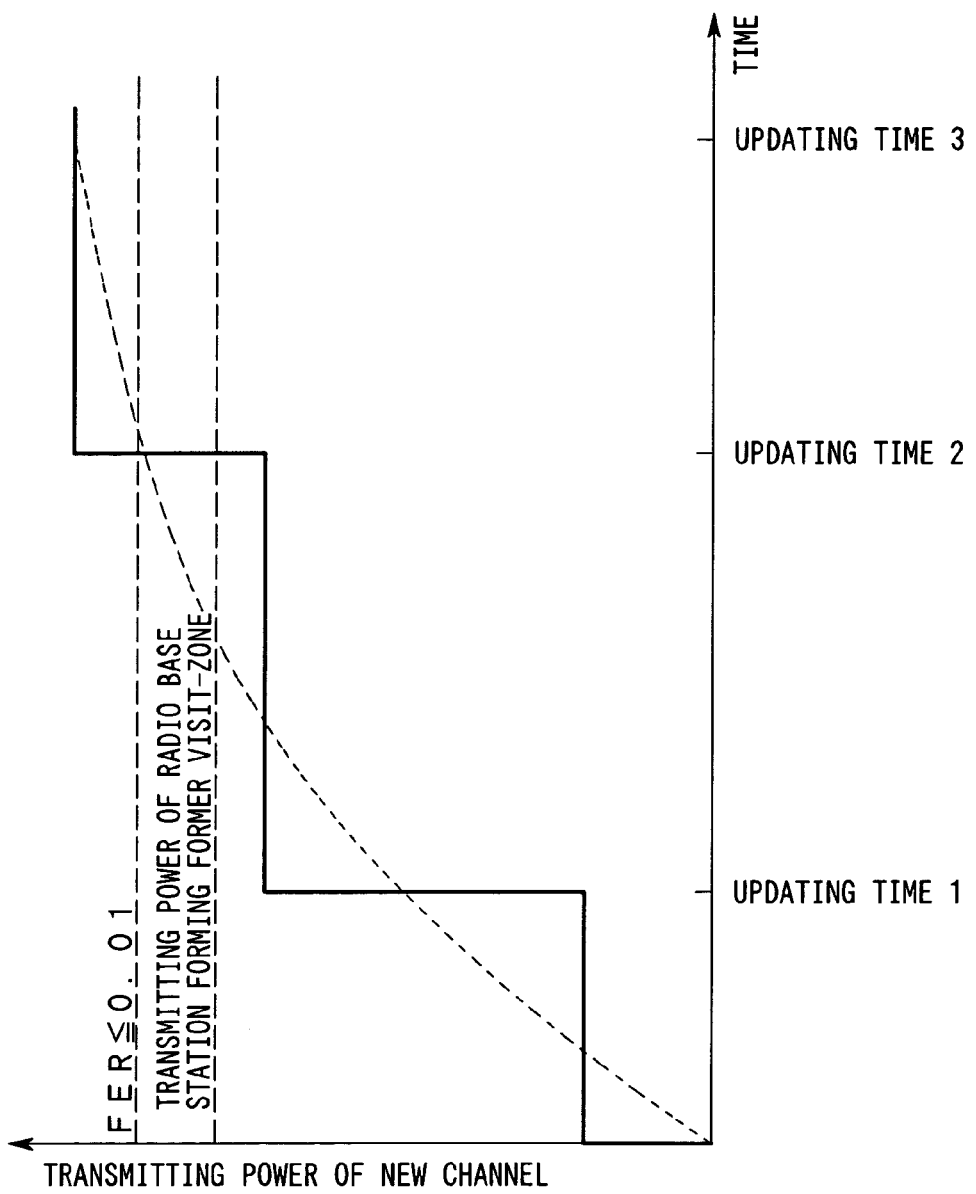
FIG. 8 is a view (2) showing transmitting power of the new channel in the embodiment of the invention.

So long as desired service quality can be secured and the increase of the running cost is allowable, such updating time and increment may be updated in a relatively long interval as shown in FIG. 8, for example.

Further, this embodiment does not at all describe the allowable upper limit value for setting transmitting power of the new channel.

However, such an upper limit value may be any value that is determined in advance or that can be varied appropriately on the basis of the procedure of channel control or call setup so long as the upper limit value is below the maximum value that the mobile station 70 and the radio base station 42-2 can physically transmit, and so long as degradation of transmission quality that may occur due to interference and jamming in the radio channel formed in parallel remains at an allowable extent.

Figure 9:
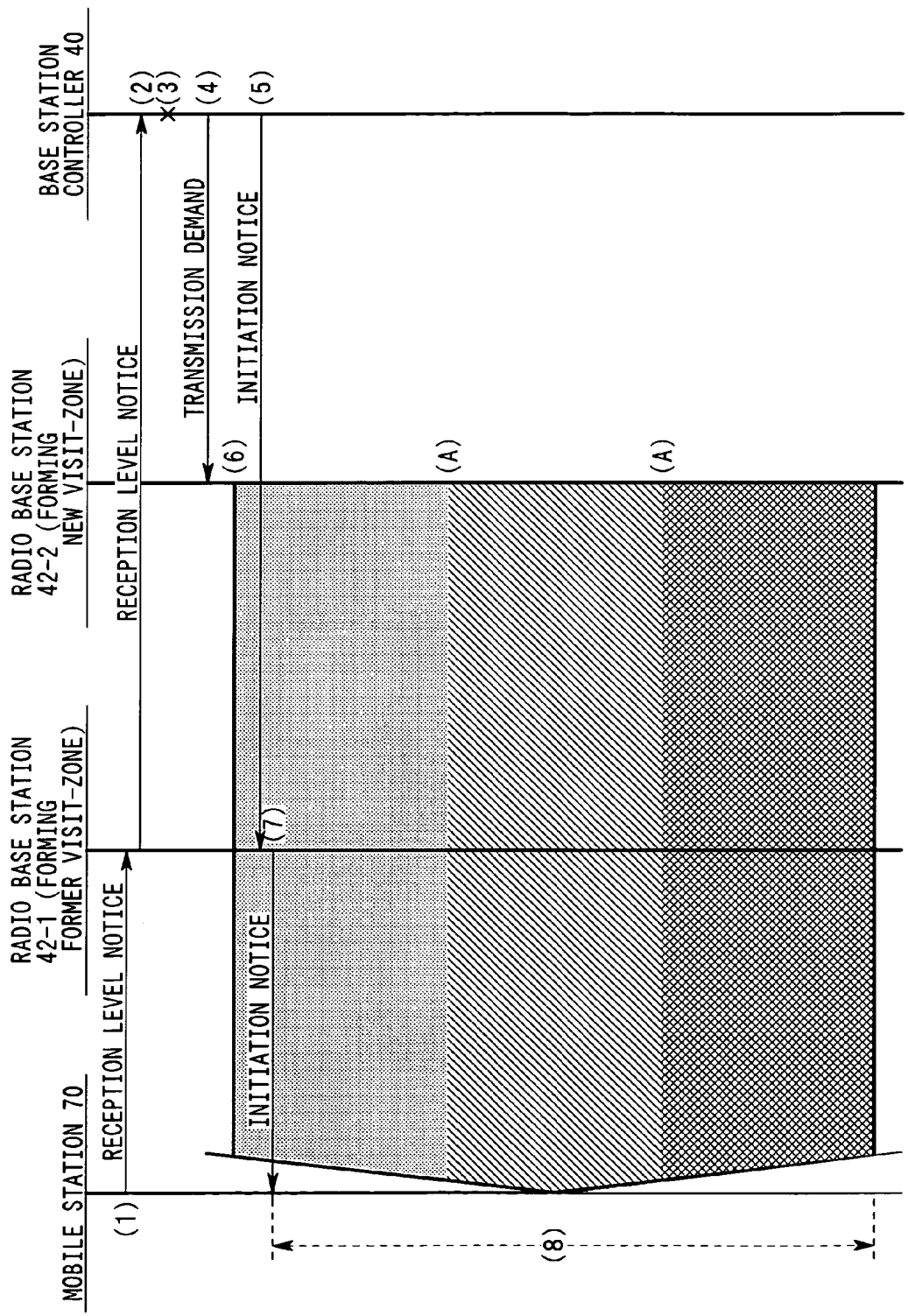
FIG. 9 is a view useful for explaining the operation of the second embodiment of the invention.

FIG. 9 is a view useful for explaining the operation of the second embodiment of the invention.

In the drawing, the same reference numeral is allotted to the same processing (FIGS. 6(1) to (6) and (8)) as that of the first embodiment and its explanation will be omitted.

Hereinafter, the operation of the second embodiment of the invention will be explained with reference to FIGS. 4, 5 and 9.

The differences of this embodiment from the first embodiment are as follows.

After sending the initiation notice to the radio base station 42-1, the base station controller 40 does not execute the processing for sending the transmitting power update demand (FIG. 6(9)).

The radio base station 42-2 forming the new visit-zone executes the following processing.

Identifying the transmission demand sent by the base station controller 40, the controlling part 43-2 in the radio base station 42-2 starts transmitting to the new channel at transmitting power equal to the initial value already described (FIG. 9(6)).

In the radio base station 42-2, the controlling part 43-2 starts measuring the time, that is executed by the base station controller 40 in the first embodiment, from the point at which transmission of the new visit-zone is started, and updates transmitting power of the new channel whenever a predetermined time (called hereinafter the "updating point", which need not always be constant) expires (FIG. 9(A)).

According to this embodiment, the load of the controlling part 41 provided to the base station controller 40 is dispersed to the radio base stations 42-1 to 42-N. Therefore, the possibility of the occurrence of the overloaded state and the congestion state of the base station controller 40 becomes smaller than in the first embodiment, the throughput required for the controlling part 41 can be reduced, and service quality can be improved.

Next, the third embodiment of the invention will be explained.

The structural difference of this embodiment from the first embodiment is that a mobile station 70A is provided in place of the mobile station 70.

Figure 10:
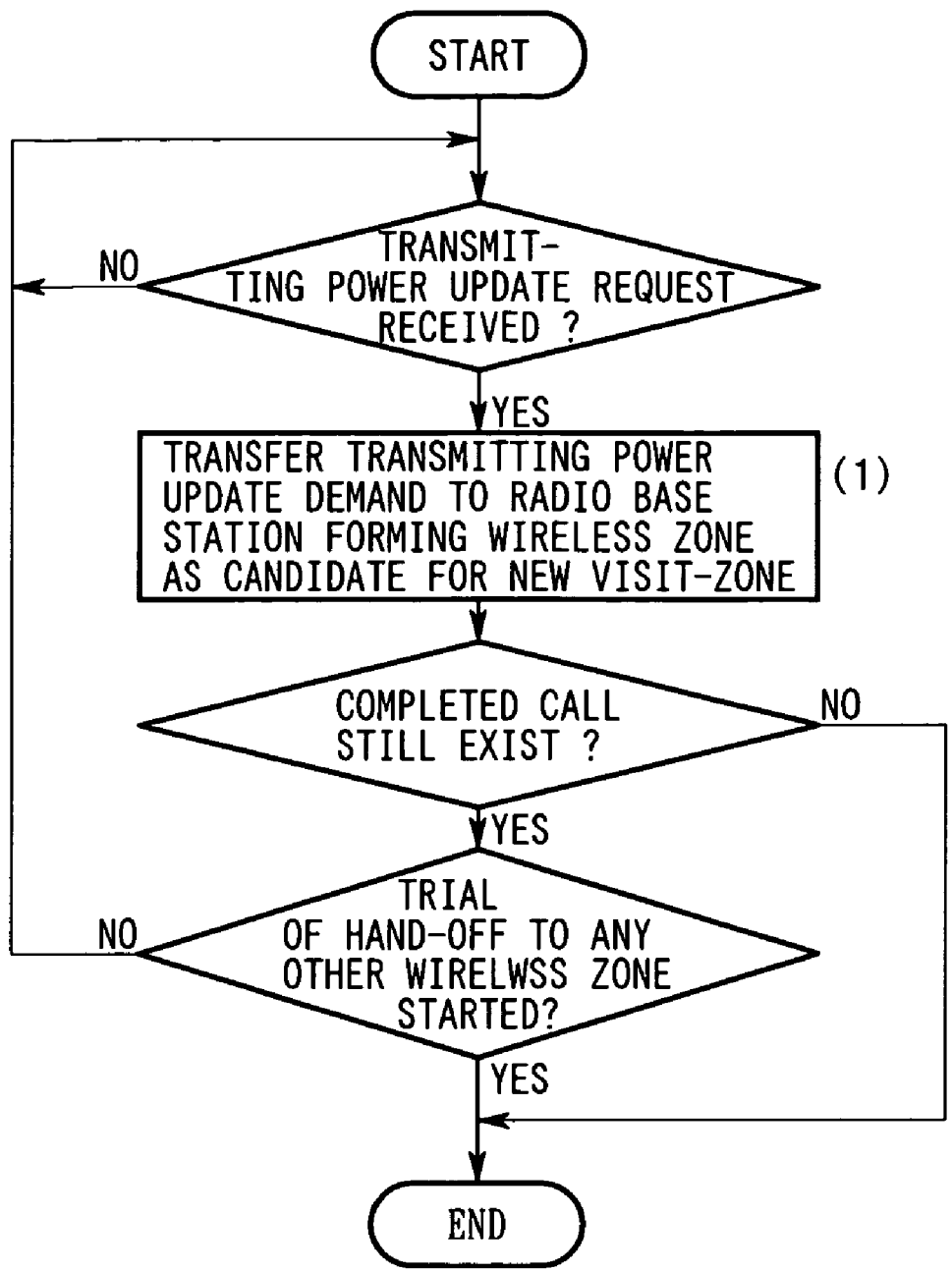
FIG. 10 shows an operation flowchart of the third to fifth embodiments of the invention.

FIG. 10 is an operation flowchart of the third to fifth embodiments of the invention.

Figure 11:
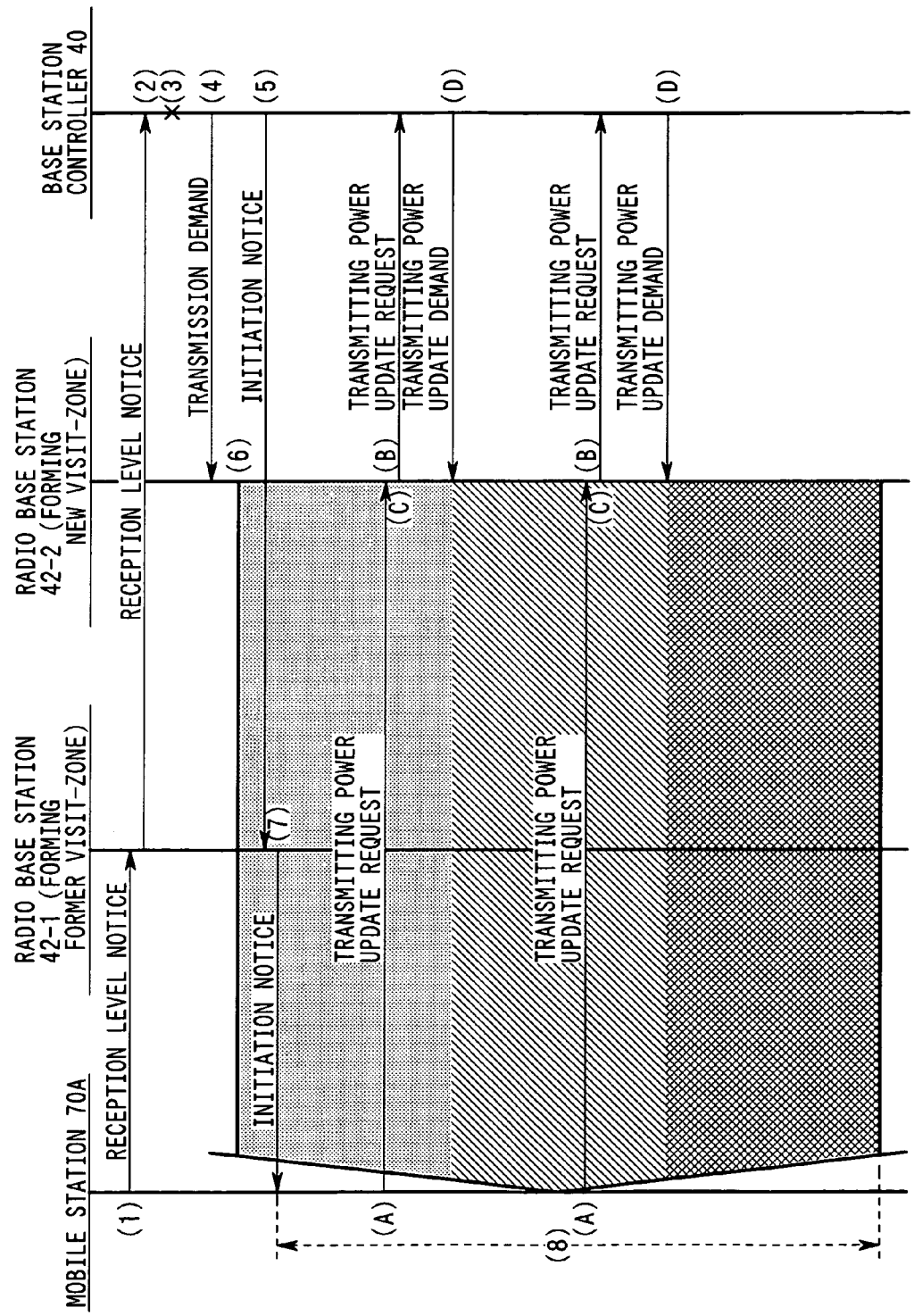
FIG. 11 is a view useful for explaining the operation of the third embodiment of the invention.

FIG. 11 is a view useful for explaining the operation of the third embodiment of the invention.

In these drawings, the same reference numeral is use to identify the same processing as the processing shown in FIGS. 6(1) to (6) and (8), and its explanation will be omitted.

The difference of this embodiment from the first embodiment resides in the following processing procedures executed by the mobile station 70A and the controlling part 41 provided to the base station controller 40.

The mobile station 70A identifies the initiation notice transmitted from the base station controller 40 and transferred by the radio base station 42-1, and monitors transmission quality (such as the frame error rate FER) or the level of the reception wave coming from the radio base station 42-2 through the new channel represented by the channel identifier contained in the initiation notice (FIG. 11(8)).

The mobile station 70A judges whether or not this transmission quality or the level is below a predetermined lower limit value, and repeatedly transmits the transmitting power update request representing this insufficiency and containing the identifier of the local station to the corresponding new channel at predetermined transmitting power and in a predetermined cycle during the period in which the judgment result remains false (FIG. 11(A)).

During such a period, the propagation loss of the radio transmission channel formed between the mobile station 70A and the radio base station 42-2 can remarkably fluctuate depending on landform or the distribution of planimetry existing around them.

Therefore, the propagation loss does not always become small to such an extent that the radio base station 42-2 can normally receive the transmitting power update request described above.

In the radio base station 42-2, on the other hand, the controlling part 43-2 identifies the transmitting power update request reaching the antenna 61-2 through the new channel and received through the transmitting/receiving part 62-2 (FIG. 11(B)), and transfers this transmitting power update request to the base station controller 40 through the communication link 53 (FIG. 11(C)).

Receiving the transmitting power update request through the communication link 53, the controlling part 41 in the base station controller 40 transfers the transmitting power update demand to the radio base station 42-2 through the communication link 53 in the same way as when the update point reaches in the first embodiment (FIG. 10(1) and 11(D)).

The radio base station updates transmitting power of the new channel to a large value (a value in the range of the increment contained in the transmitting power update demand) such that this transmitting power update demand can be transmitted.

In other words, transmitting power of the new channel is not updated till the time point at which the transmission loss of the radio transmission channel formed between the mobile station 70A and the radio base station 42-2 becomes s small value to such an extent that the transmitting power update request transmitted by the mobile station 70A to the new channel can be received by the radio base station 42-2. Thereafter, this transmitting power is gradually updated until the level of the reception wave reaching the mobile station 70A through the new channel exceeds a desired value.

In comparison with the first and second embodiments described above, this embodiment updates more rationally transmitting power of the new channel, and can improve reliability in the radio base station 42-2 to execute transmission to the new channel in addition to saving of consumed power.

Incidentally, the controlling part 41 provided to the base station controller 40 in this embodiment transmits the transmitting power update demand without executing any specific processing when it receives the transmitting power update request.

However, the controlling part 41 may execute the following processing in combination on the basis of the procedure of channel control, for example.

Processing for grasping a current value of transmitting power of the new channel according to the number of the transmitting power update demands generated previously.

Processing for judging whether or not the current value reaches an upper limit value suitable for the procedure of channel control and for suspending transmission of a subsequent transmitting power update demand when the judgment result proves YES.

Processing for appropriately updating transmitting power of the new channel on the basis of the procedure of channel control even when the transmitting power update request described above is not given.

Next, the fourth embodiment of the invention will be explained.

Figure 12:
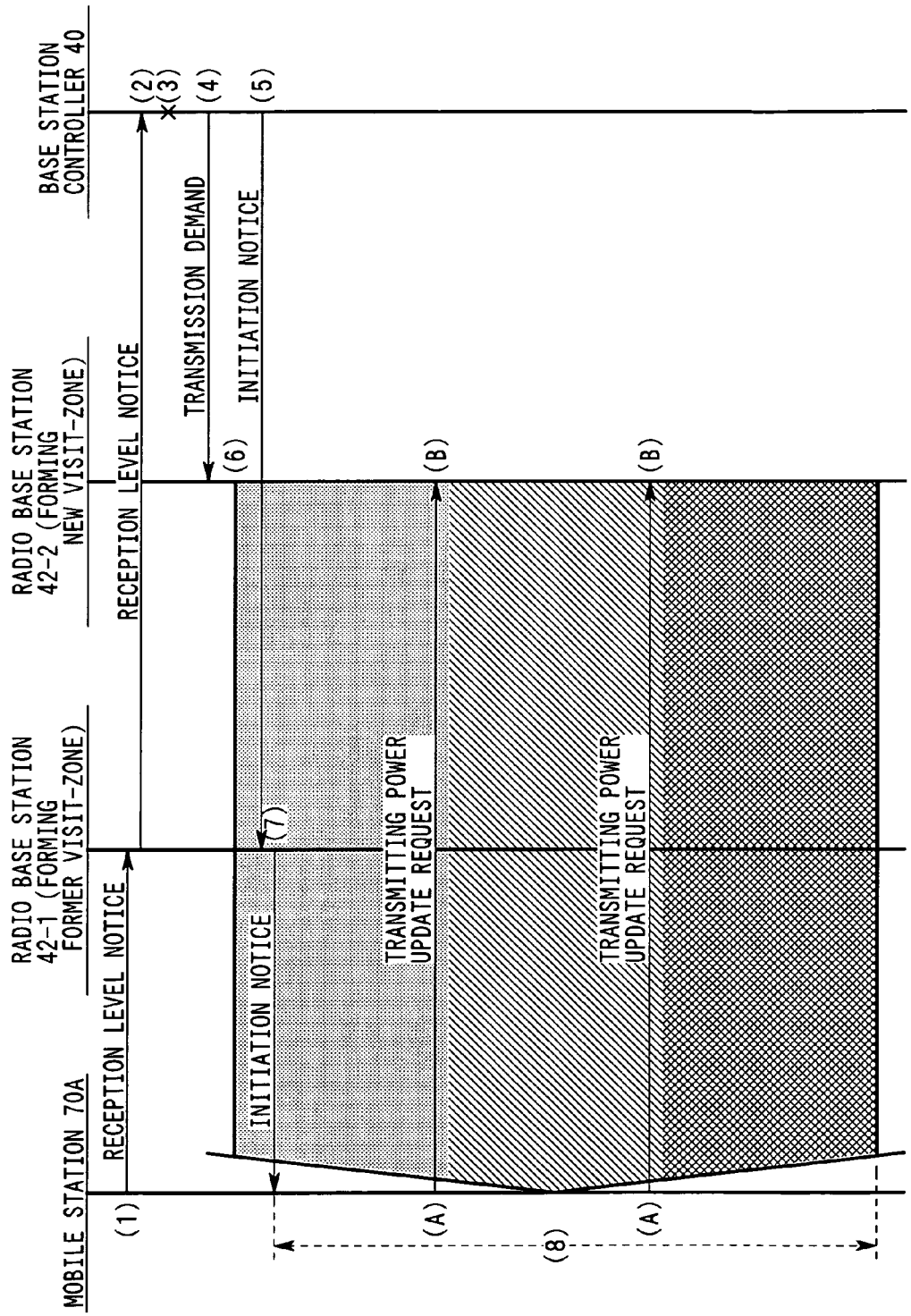
FIG. 12 is a view useful for explaining the operation of the fourth embodiment of the invention.

FIG. 12 is a view useful for explaining the fourth embodiment of the operation of the invention.

The operation of the fourth embodiment of the invention will be explained with reference to FIGS. 4 and 12.

The difference of this embodiment from the third embodiment resides in the following processing procedure executed by the controlling part 43-2 provided to the radio base station 42-2.

When the mobile station 70A transmits the transmitting power update request (FIG. 12(A)) and applies it to the controlling part 43-2 of the radio base station 42-2 through the new channel (FIG. 12(B)), the controlling part 43-2 does not transfer this transmitting power update request to the base station controller 40 but updates the value of transmitting power of the new channel to a large value in the same way as when the transmitting power update demand is given from the base station controller 40 in the third embodiment.

In other words, the processing to be executed by the radio base station 42-2 and the base station controller 40 can be simplified.

In consequence, this embodiment can reduce the load and the running cost and can improve service quality much more than the third embodiment.

Next, the fifth embodiment of the invention will be explained.

The structural difference of this embodiment from the third embodiment is that a mobile station 70B is provided in place of the mobile station 70A.

Figure 13:
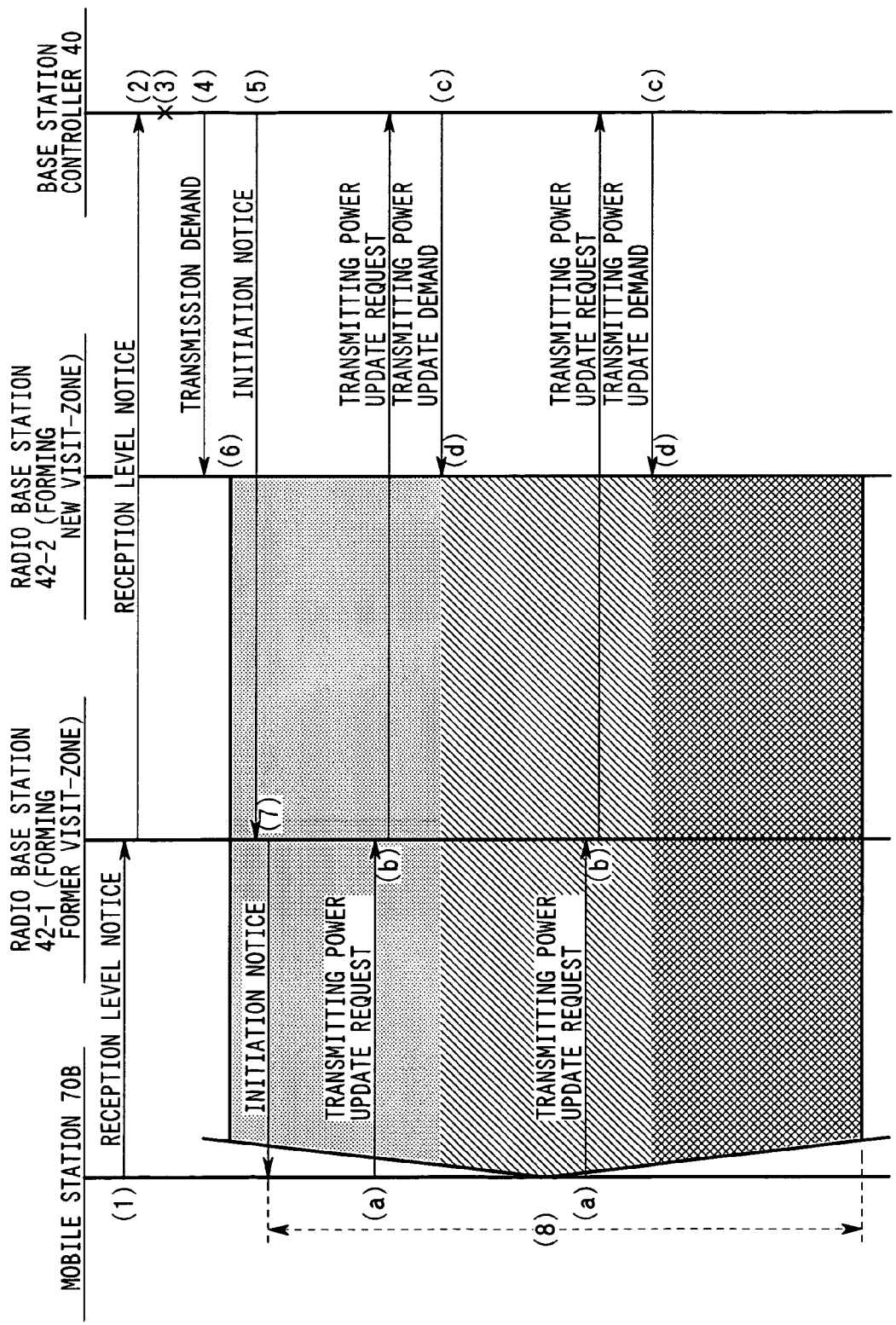
FIG. 13 is a view useful for explaining the operation of the fifth embodiment of the invention.

FIG. 13 is a view useful for explaining the operation of the fifth embodiment of the invention.

The operation of the fifth embodiment of the invention will be explained with reference to FIGS. 4 and 13.

The difference of this embodiment from the third embodiment resides in the following processing procedure executed by the mobile station 70B and the controlling part 43-1 provided to the radio base station 42-1.

The mobile station 70B identifies the initiation notice sent by the base station controller 40 and transferred through the radio base station 42-1, and monitors transmission quality (such as the frame error rate FER) or the level of the reception wave reaching from the radio base station 42-2 through the new channel that is represented by the channel identifier contained in the initiation notice.

The mobile station 70B judges whether or not transmission quality or the level exceeds a predetermined low limit value, and generates the transmitting power update request that signifies the judgment result and contains the identifier of the local station, on the basis of the same procedure as that of the third embodiment during the period in which the judgment result proves NO.

However, the mobile station 70B does not send the transmitting power update request to the radio base station 42-2 that forms the new visit-zone, but transmits it repeatedly to the radio base station 42-1 at predetermined transmitting power and in a predetermined cycle (FIG. 13(a)).

The controlling part 43-1 in the radio base station 42-1 inputs the transmitting power update request received through the antenna 61-1 and the transmitting/receiving part 62-1, and transfers this transmitting power update request to the base station controller 40 through the communication link 53 (FIG. 13(b)).

Receiving the transmitting power update request through the communication link 53, the controlling part 41 in the base station controller 40 transmits the transmitting power update demand to the radio base station 42-2 through the communication link 53 in the same way as when the update point reaches in the first embodiment (FIG. 13(c)).

Whenever this transmitting power update demand is given, the radio base station 42-2 updates transmitting power of the new channel to a predetermined large value (a large value in the range of the increment contained in the transmitting power update demand) (FIG. 13(d)).

In other words, so long as transmission quality of the former visit-zone is satisfactory to such an extent that continuation of the communication service is allowable, the transmitting power update request transmitted by the mobile station 70B is received with reliability by the radio base station 42-1 and is transferred to the base station controller 40 through the communication link 53.

Therefore, this embodiment can update more flexibly the value of transmitting power of the new channel in accordance with the procedure of the channel control processing executed in the mobile station 70B than in the third embodiment where the transmitting power update request is transmitted to the radio base station 42-2 through the new channel.

Figure 14:
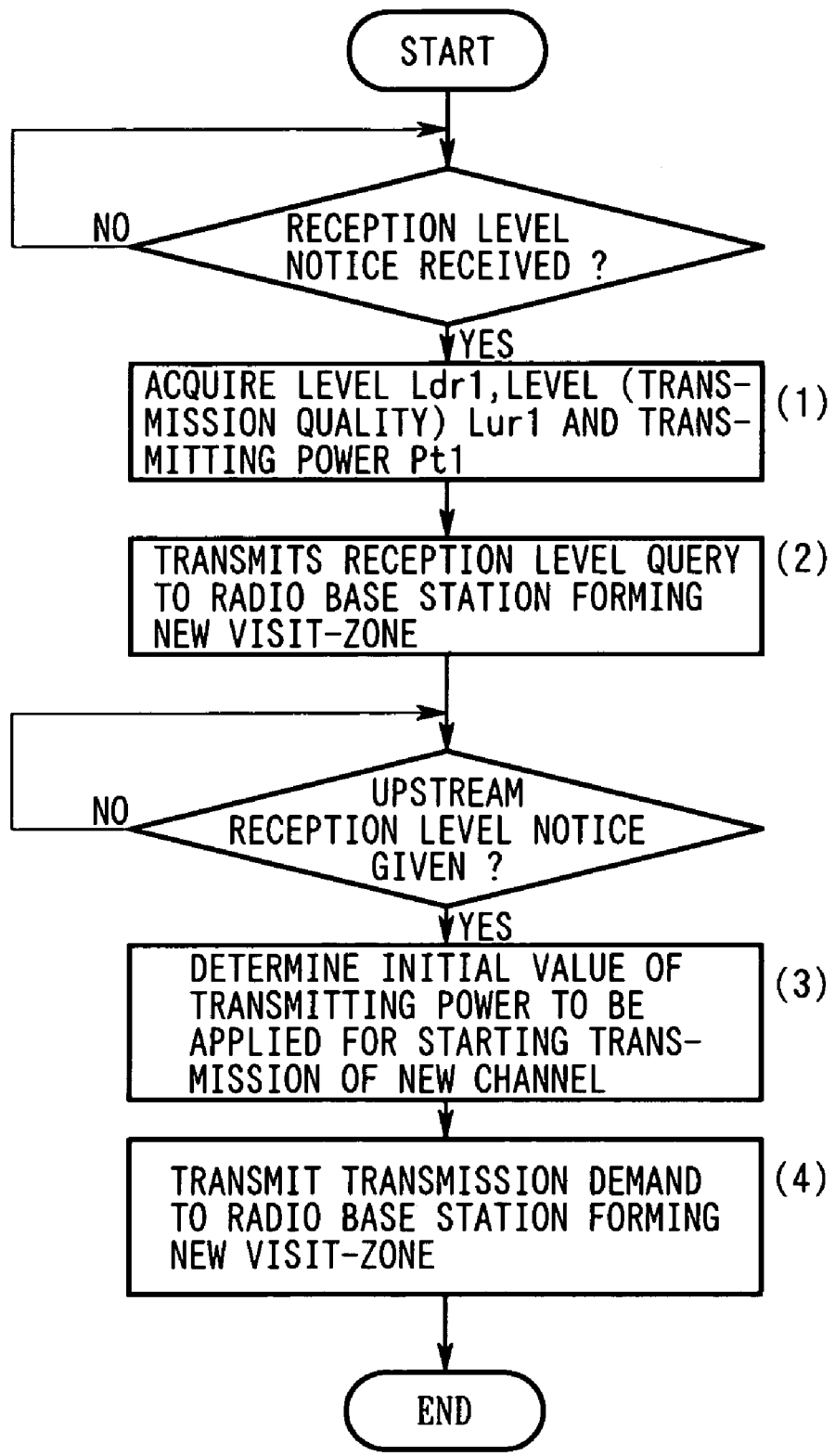
FIG. 14 shows an operation flowchart of the sixth embodiment of the invention.

FIG. 14 is an operation flowchart of the sixth embodiment of the invention.

Figure 15:
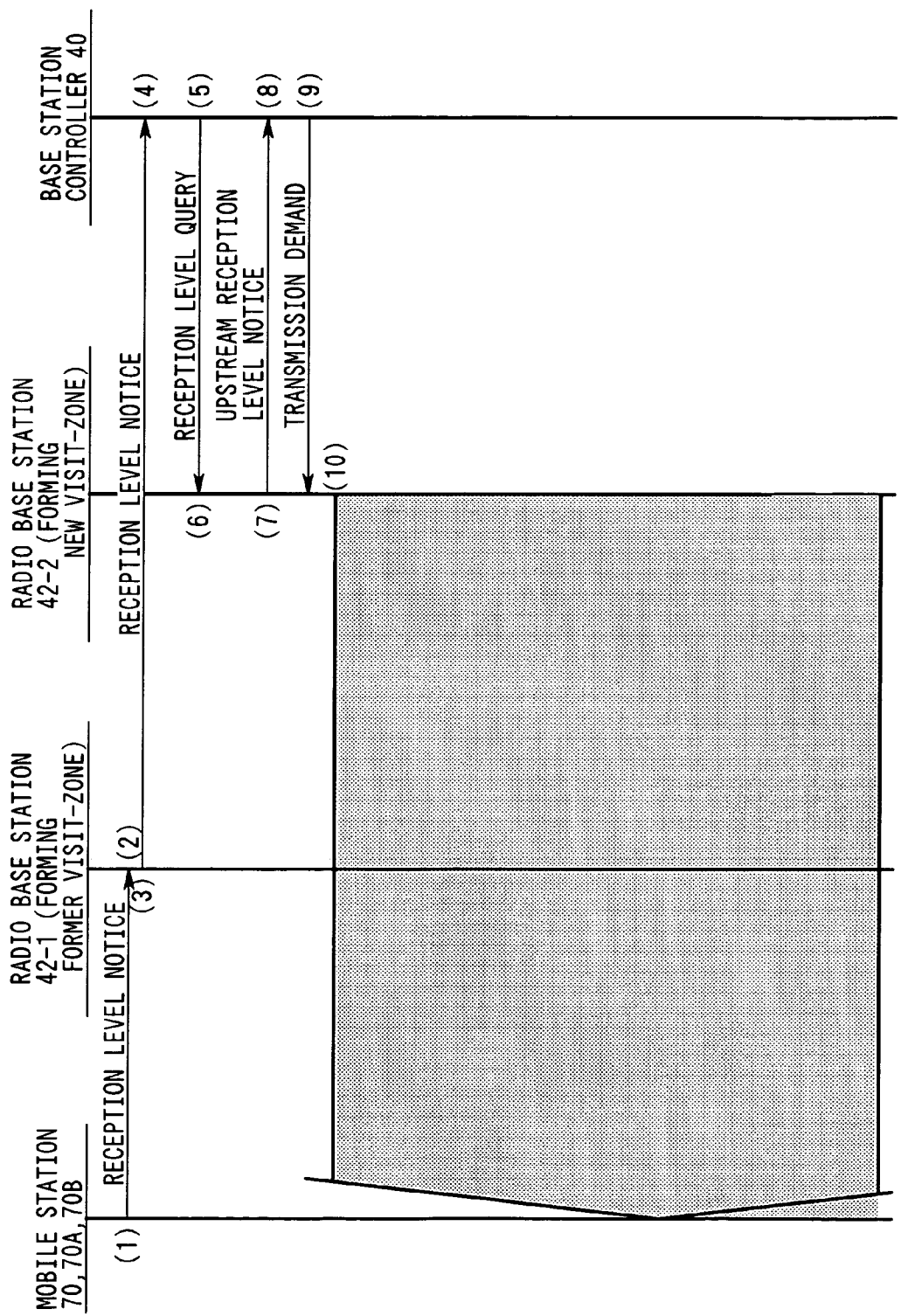
FIG. 15 is a view (1) useful for explaining the operation of the sixth embodiment of the invention.

FIG. 15 is a view (1) useful for explaining the operation of the sixth embodiment of the invention.

Figure 16:
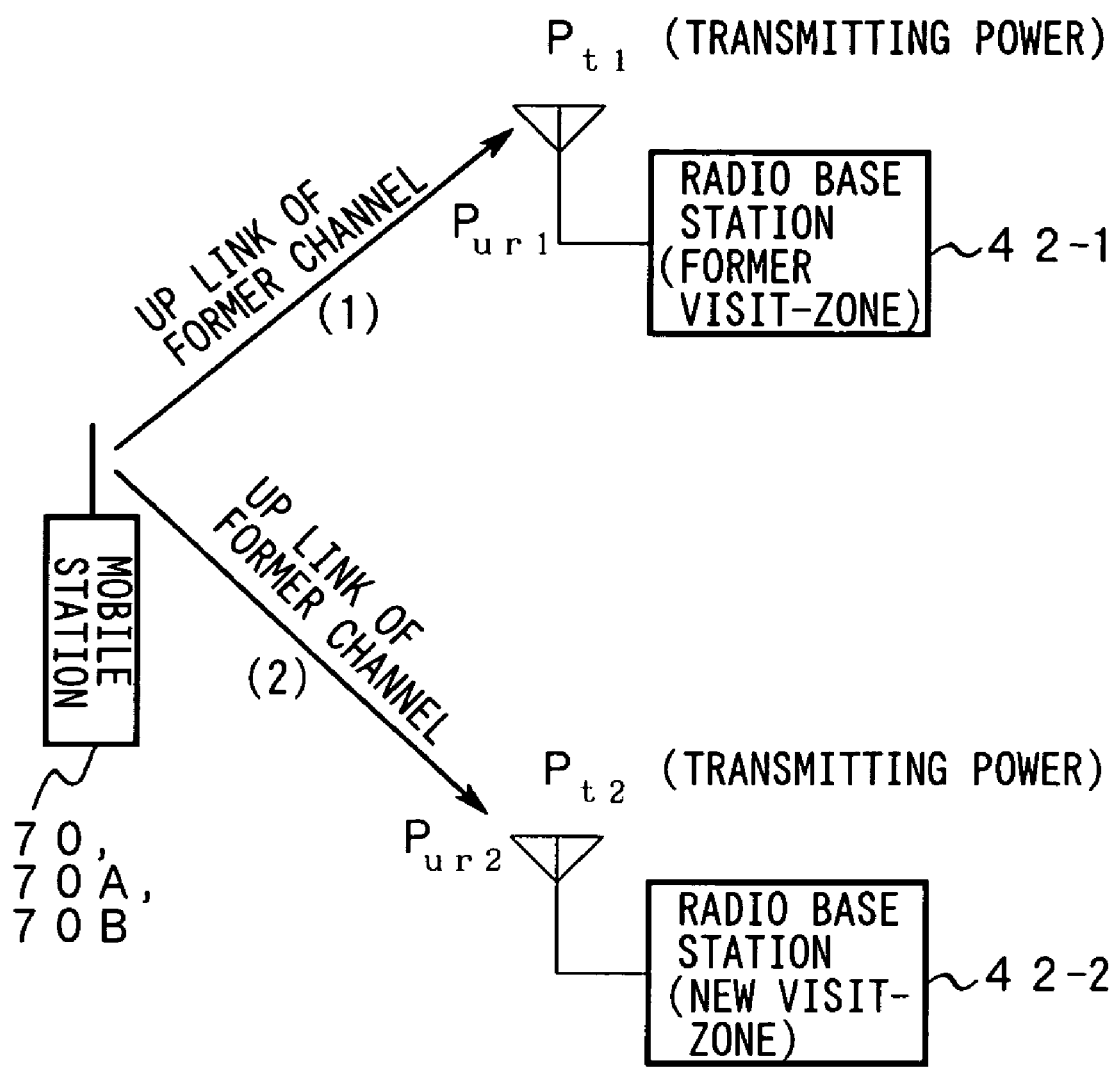
FIG. 16 is a view (2) useful for explaining the operation of the sixth embodiment of the invention.

FIG. 16 is a view (2) useful for explaining the operation of the sixth embodiment of the invention.

Hereinafter, the operation of the sixth embodiment of the invention will be explained with reference to FIGS. 4 and 14 to 16.

The difference of this embodiment from the first to fifth embodiments resides in the following processing to be executed, by each part in cooperation with others, for computing the initial value of transmitting power of the new channel.

The transmitting/receiving part 62-1 in the radio base station 42-1 appropriately measures the level (transmission quality) of the reception wave reaching the local station through the individual radio channel.

The controlling part 43-1 identifies the afore-mentioned reception level notice transmitted by the mobile stations 70, 70a and 70B (FIG. 15(1)), and acquires (FIG. 15(2)) the value $P_{t1}$ of transmitting power of the radio channel (hereinafter called the "former channel") through which the transmitting/receiving part 62-1 executes transmission to the mobile stations 70, 70A and 70B, in addition to the level (transmission quality) $L_{ur1}$ measured by the transmitting/receiving part 62-1 for the reception wave modulated by the reception level notice (FIG. 16(1)).

The controlling part 43-1 sends a new level reception notice, that is obtained by adding the level (transmission quality) ($L_{ur1}$) and the value $P_{t1}$ of transmitting power to the reception level notice described above, to the base station controller 40 through the communication link 53 (FIG. 15(3)).

On the other hand, the controlling part 41 in the base station controller 40 identifies this reception level notice and acquires the level $L_{dr1}$, the level (transmission quality) $L_{ur1}$ and the value of transmitting power $P_{t1}$ (FIGS. 14(1), 15(4)).

The controlling part 41 stipulates the radio base station 42-2 that forms the candidate for the new visit-zone in the same way as in the first to fifth embodiments, and transmits the reception level query containing the identifier of the former channel, that is applied to the transmission of the speech signal of the mobile station 70, 70A, 70B, to the radio base station 42-2, through the communication link 53 (FIGS. 14(2) and 15(5)).

The controlling part 43-2 of the radio base station 42-2 cooperates with the transmitting/receiving part 62-2 and measures the level (transmission quality) $L_{ur2}$ of the reception wave (modulated by the speech signal; FIG. 16(2)) reaching from the mobile station 70, 70A, 70B through the former channel represented by the identifier contained in the reception level query (FIG. 15(6)).

It is hereby assumed for simplicity that the mobile stations 70, 70A and 70B transmit the speech signal and the reception level notice described above at the same transmitting power.

The controlling part 43-2 transmits the upstream reception level notice containing the level (transmission quality) $L_{ur2}$ to the base station controller 40 through the communication link 53 (FIG. 15(7)).

The controlling part 41 in the base station controller 40 executes the arithmetic operation represented by the following formula for the level $L_{ur2}$ contained in this upstream reception level notice, the level $L_{ur1}$ and the value $P_{t1}$ of transmitting power, and determines the initial value $P_{t2}$ of transmitting power to be applied to the start of transmission of the new channel (FIGS. 14(3) and 15(8)):

$$P_{t2}=P_{t1}+(L_{ur1}-L_{ur2})$$

Incidentally, it is assumed hereby that the value of each item on the right side of this formula is a value whose relative value to the predetermined reference value is given as a logarithm (a decibel value).

The transmitting part 41 further transmits the transmission demand containing its initial value $P_{t2}$ to the radio base station 42-2 through the communication link 53 (FIGS. 14(4) and 15(9)).

Identifying this transmission demand, the controlling part 43-2 in the radio base station 42-2 starts transmitting to the new channel at transmitting power equal to the initial value $P_{t2}$ contained in the transmission demand (FIG. 15(10)).

The procedure of the processing executed by each part while keeping cooperation with one another after the start of the transmission of the new channel is the same as that of the first to fifth embodiments, and its explanation is omitted.

As described above, this embodiment determines the difference of substantial transmission quality of the upstream link between the former visit-zone and the new visit-zone, and starts transmission of the new visit-zone at transmitting power equal to the sum of the value of transmitting power of the former visit-zone and this difference.

In comparison with the first to fifth embodiments, therefore, interference occurring in other radio channels due to unnecessary updating of transmitting power or due to excess of transmitting power can be restricted or avoided with higher probability.

Incidentally, the radio base station 42-2 forming the former visit-zone notifies the value $P_{t1}$ of transmitting power of the former channel to the base station controller 40 in this embodiment.

However, the controlling unit 41 provided to the base station controller 40 may instruct appropriately the value $P_{t1}$ of transmitting power to the radio base station 42-2 on the basis of the channel control procedure, for example.

Next, the seventh embodiment of the present invention will be explained.

The structural difference of this embodiment from the first to fifth embodiments resides in that a mobile station 70C is provided in place of the mobile stations 70, 70A and 70B.

Figure 17:
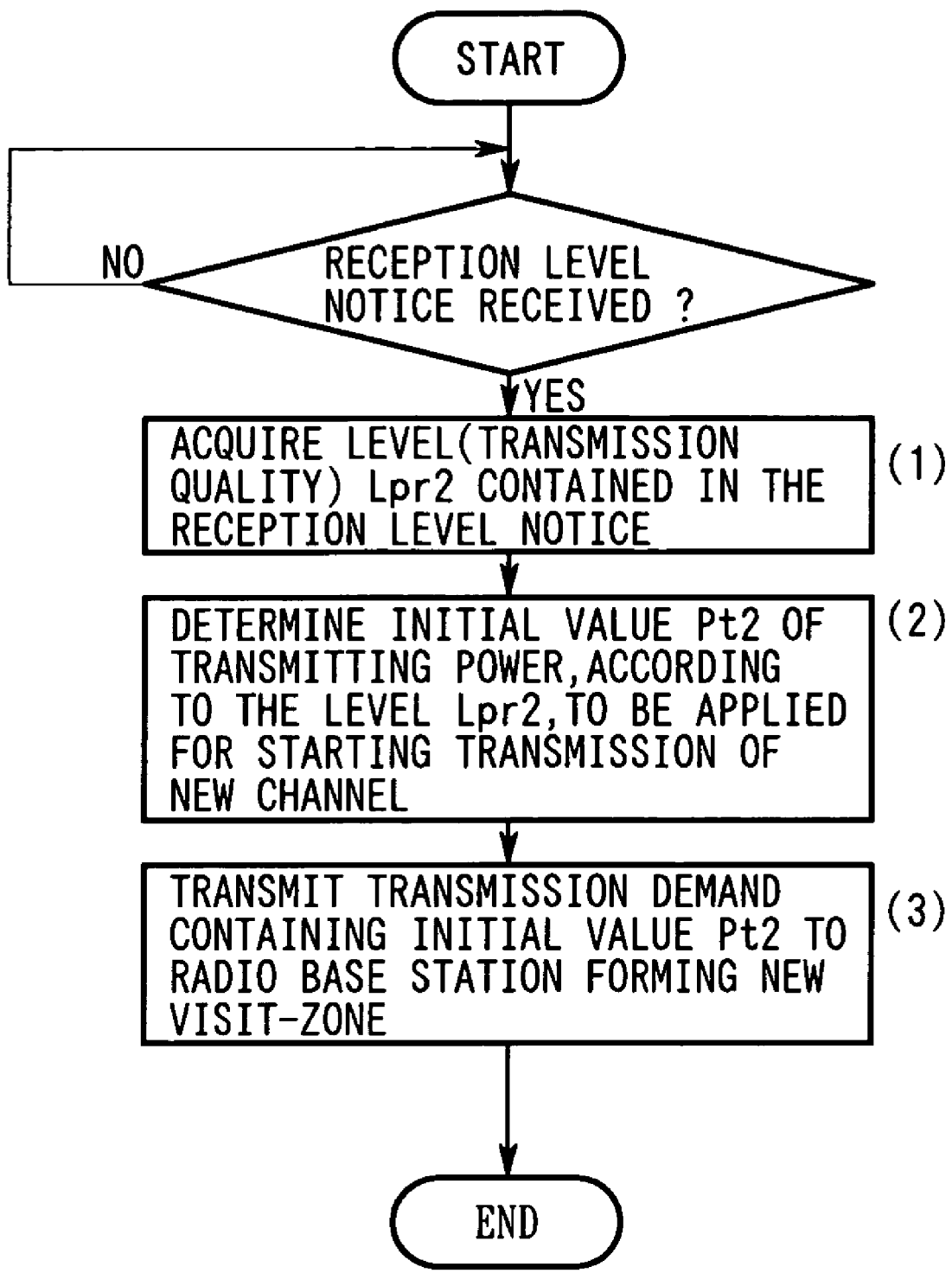
FIG. 17 shows an operation flowchart of the seventh embodiment of the invention.

FIG. 17 is an operation flowchart of the seventh embodiment of the invention.

Figure 18:
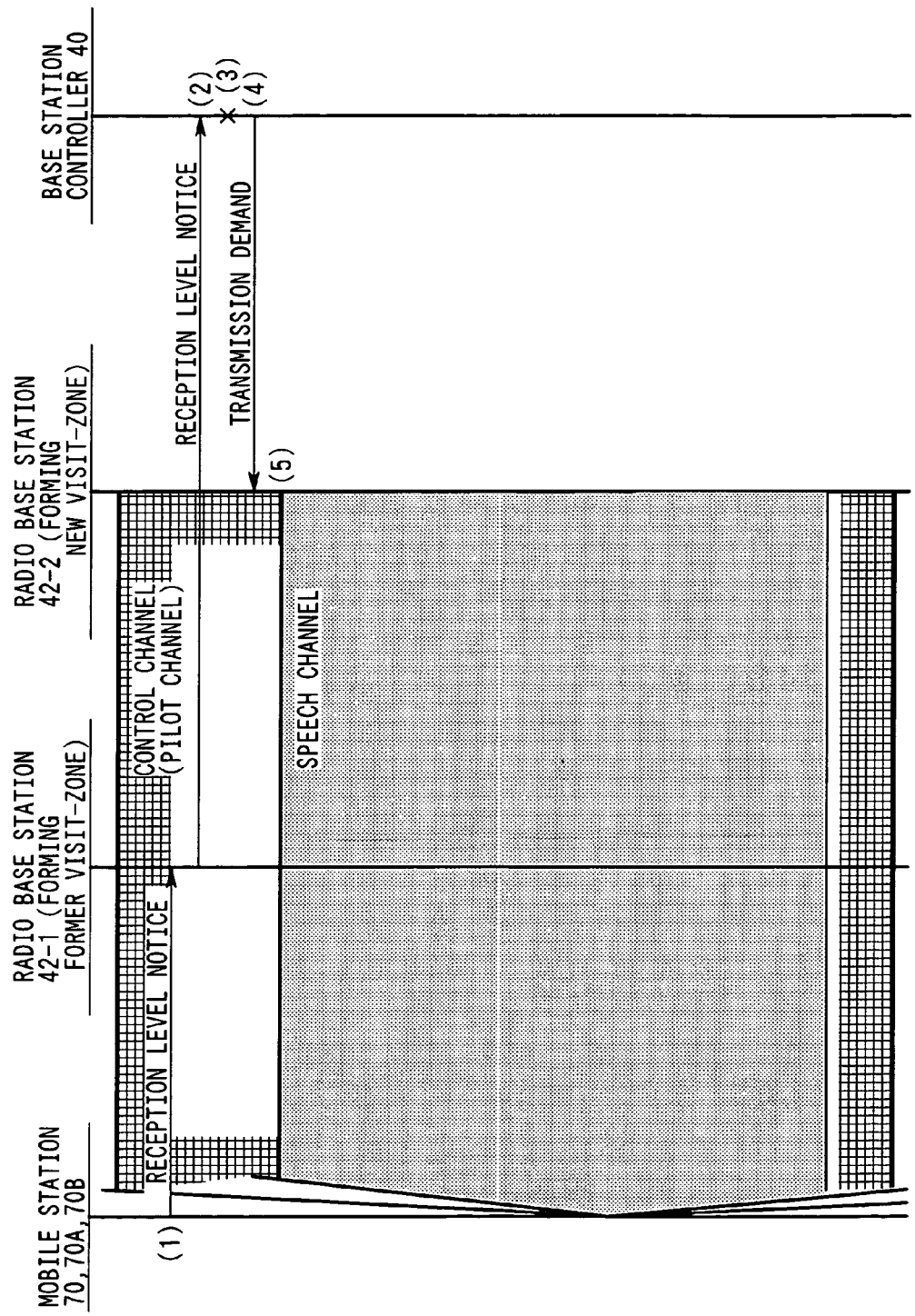
FIG. 18 is a view (1) useful for explaining the operation of the seventh embodiment of the invention.

FIG. 18 is a view (1) useful for explaining the operation of the seventh embodiment of the invention.

Figure 19:
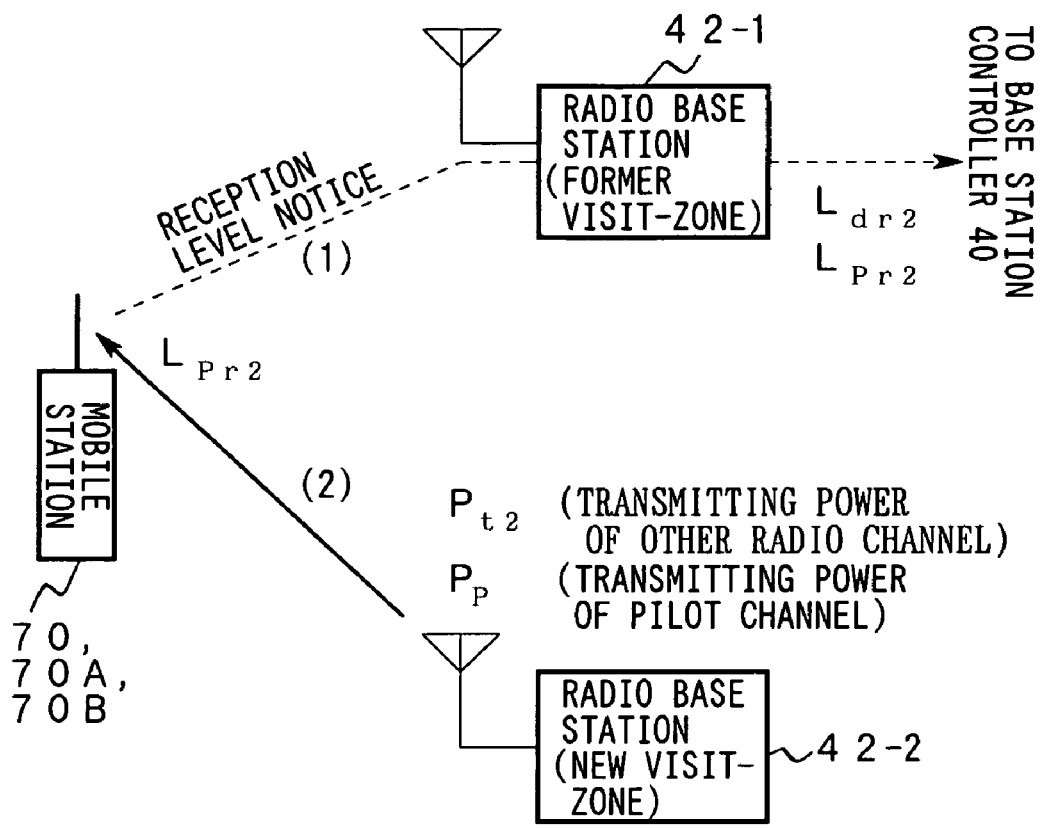
FIG. 19 is a view (2) useful for explaining the operation of the seventh embodiment of the invention.

FIG. 19 is a view (2) useful for explaining the operation of the seventh embodiment of the invention.

The operation of the seventh embodiment of the invention will be explained with reference to FIGS. 4 and 17 to 19.

The difference of this embodiment from the sixth embodiment resides in the procedure of the following processing that the mobile station 70C, the radio base stations 42-1 and 42-2 and the base station controller 40 execute in cooperation with one another in order to determine the initial value of transmitting power applied at the start of transmission of the radio base station 42-2 to the new channel.

The controlling part 41 in the base station controller 40 incessantly grasps transmitting power of a specific control channel (pilot channel) to be applied on the basis of the channel control procedure during the process in which broadcasted information and other control information is transmitted to the mobile stations situated in the wireless zones 60Z-1 to 60Z-N and the call occurring in these mobile stations becomes a completed call.

Incidentally, it will be assumed hereby that transmitting power of the control channel through which the radio base station 42-2 executes transmission is given as a known value $P_P$ for simplicity.

The minimum value $P_{drmin}$ of the level of the reception wave, that is modulated by the downstream speech signal and is to reach the mobile station 70C through the new channel, is given to the controlling part 41 so that the mobile station 70C can normally complete handoff and can continue transmission/reception of the speech signal.

Incidentally, this minimum value $P_{drmin}$ need not always be a constant, but may be set appropriately in accordance with the channel control procedure, for example, or may be set to a value individually corresponding to any of the following:

radio base station 42-1 to 42-N, radio channels that can be individually allotted as the new channels to these radio base stations 42-1 to 42-N.

The mobile station 70C identifies, in a predetermined frequency, the control channel of a single or a plurality of wireless zones (hereinafter called the "adjacent wireless zones") adjacent to the wireless zone in which the local station is situated, and measures the level of the reception wave that is received through the control channels of these adjacent wireless zones.

The mobile station 70C further adds the level $L_{pr2}$ of the reception wave (FIG. 19(2)) received through the control channels (that is hereby assumed as a single wireless zone formed by only the radio base station 42-2 for the sake of simplicity) together with the level (transmission quality) $L_{dr1}$ of the former channel to the reception level notice (FIGS. 18(1) and 19(1)) that is to be transmitted to the radio base station 42-1.

The controlling part 41 in the base station controller 40 accepts the reception level notice transferred by the radio base station 42-1 and given through the communication link 53 and acquires the level $L_{pr2}$ contained in this reception level notice (FIGS. 17(1) and 18(2)).

The controlling part 41 executes the arithmetic operation given by the following formula and determines the initial value of transmitting power to be applied at the start of transmission of the new channel (FIGS. 17(2) and 18(3)):

$$P_{t2}=P_{drmin}+(P_P-L_{pr2})$$

Incidentally, the value of each item on the right side of the formula is hereby assumed as a value whose relative value to the predetermined reference value is given as a logarithm (decibel value).

The controlling part 41 transmits the transmission demand containing the initial value $P_{t2}$ to the radio base station 42-2 through the communication link 53 (FIGS. 17(3) and 18(4)).

The controlling part 43-2 in the radio base station 42-2 identifies this transmission demand and starts transmitting to the new channel at transmitting power equal to the initial value $P_{t2}$ contained in the transmission demand (FIG. 18(5)).

Incidentally, the procedure of the processing that is executed by each part in cooperation with others after the start of transmission of the new channel is the same as that of the first to fifth embodiments, and its explanation is omitted.

According to this embodiment, the transmission loss of the radio transmission channel formed between the radio base station 42-2 and the mobile station 70C in the new visit-zone can be substantially determined, and transmission of the new channel is started at transmission power equal to the difference between the value of transmitting power of the control channel as the reference of computation of the transmission loss and this transmission loss.

The initial value described above is the value that substantially keeps transmission quality of the former visit-zone in the new channel, too.

Therefore, compared to the first to fifth embodiments, interference to other radio channels, that can occur as transmitting power of the new channel is unnecessarily updated or this transmitting power is set to an excessively large value, can be restricted or avoided with higher probability.

Next, the operation of the eighth embodiment of the invention will be explained with reference to FIG. 4.

The difference of this embodiment from the first to seventh embodiments resides in the procedure of the following processing that is executed by the controlling part 41 provided to the base station controller 40 and the controlling part 43-2 provided to the radio base station 42-2.

The controlling part 41 in the base station controller 40 monitors the transmission rate at which the transmission information (the speech signal) is to be transmitted to the mobile stations 70, 70A, 70B and 70C in which a completed call occurs and exists, on the basis of the procedure of channel control (FIG. 20(1)).

Incidentally, the processing to be executed by the controlling part 41 so as to identify the transmission rate can be accomplished by various known technologies, and does not constitute the gist of the invention. Therefore, the detailed explanation of this procedure is hereby omitted.

When the radio base station 42-2 that forms the new visit-zone of the mobile stations 70, 70A, 70B and 70C does not yet start transmission to the new channel, the controlling part 41 appends the following correction coefficient r to the transmission demand (FIG. 20(2)).

The correction coefficient r is defined as a ratio (=S/s) of the following bit rates S and s.

Bit rate S of the transmission information (combination of speech and desired data or only such data) to be practically transmitted;

Bit rate s of a predetermined speech signal to be transmitted as the transmission information described above when speech communication service by conversation is offered.

When the radio base station 42-2 has already started, and continued, transmission to the new channel in accordance with the transmission demand, the controlling part 41 appends the correction coefficient r to the transmitting power update demand described already.

On the other hand, the radio base station 42-2 sets and keeps both the initial value of transmitting power at which transmission to the new channel is to be started and the value of transmitting power at which transmission is executed consecutively to the new channel, to the values proportional to the correction coefficient.

In other words, since the value of transmitting power at which transmission to the new channel is to be made can be kept at a value flexibly adapting itself to the increase/decrease of the information quantity of the transmission information, the invention can be applied to the multimedia communication system while suppressing interference in the same way as in the first to seventh embodiments.

The operation of the ninth embodiment of the invention will be explained with reference to FIG. 4.

The difference of this embodiment from the eighth embodiment resides in the procedure of the following processing that is executed by the controlling part 43 provided to the radio base station 42-1 in cooperation with the controlling part 41 provided to the base station controller 40.

The controlling part 43-1 in the radio base station 42-1 monitors the transmission rate at which the transmission information is to be radio-transmitted to the mobile stations 70, 70A, 70B and 70C in which a completed call occurs and exists, on the basis of the channel control procedure.

The controlling part 43-1 computes a correction coefficient R equal to the ratio of the new transmission rate to the preceding transmission rate every time the transmission rate so monitored is updated.

The controlling part 43 transmits a transmission-rate update notice containing the corresponding call or the identifiers of the mobile stations 70, 70A, 70B and 70C to the base station controller 40 together with the value of such a correction coefficient R through the communication link 53.

The controlling part 41 in the base station controller 40 acquires the correction coefficient R contained in the transmission-rate update notice, executes the processing in the same way as in the eighth embodiment with the exception that the correction coefficient r is replaced by this correction coefficient R, and cooperates with the controlling part 43-2 provided to the radio base station 42-2.

In other words, the radio base station forming the former visit-zone executes the processing for monitoring the transmission rate and computing the correction coefficient R that replaces the correction coefficient r.

In consequence, this embodiment can reduce much more the load to the base station controller 40 and can keep higher service quality than the eighth embodiment.

The operation of the tenth embodiment of the invention will be explained with reference to FIG. 4.

The difference of this embodiment from the eighth embodiment resides in the procedure of the following processing that is executed by the mobile stations 70, 70A, 70B and 70C, the controlling part 43-1 provided to the radio base station 42-1 and the controlling part 41 provided to the base station controller 40 in cooperation with one another.

The mobile stations 70, 70A, 70B and 70C monitor the transmission rate of the transmission information to be received through the downlink of the radio transmission channel during the period in which a completed call occurs and exists in the local station.

The mobile stations 70, 70A, 70B and 70C compute the correction coefficient $R_M$ equal to the ratio of the new transmission rate and the preceding transmitting rate every time the transmission rate thus monitored is updated.

Furthermore, the mobile stations 70, 70A, 70B and 70C transmit the transmission-rate update notice containing the identifiers of the local stations together with the value of such a correction coefficient $R_M$ to the radio base station 42-1.

The controlling part 43-1 in the radio base station 42-1 receives this transmission-rate update notice through the transmitting/receiving part 62-1 and transfers this transmission-rate update notice to the base station controller 40 through the communication link 53.

The controlling part 41 in the base station controller 40 accepts the correction coefficient $R_M$ contained in the transmission-rate update notice, executes the processing in the same way as in the eighth embodiment with the exception that the correction coefficient $R_M$ is applied in place of the correction coefficient r, and cooperates with the controlling part 43-2 in the radio base station 42-2.

In other words, the mobile stations 70, 70A, 70B and 70C execute the processing for monitoring the transmission rate and computing the correction coefficient $R_M$, and the mobile stations 70, 70A, 70B and 70C and the radio base station forming the former channel execute the processing, that is executed by the base station controller 40 in the eighth embodiment, as the distributed processing.

Therefore, this embodiment can flexibly cope with the forms of channel control, can reduce the load to the base station controller 40 much more than in the eighth embodiment and can keep high service quality.

Incidentally, the mobile stations 70, 70A, 70B and 70C compute the correction coefficient $R_M$ in this embodiment.

However, the mobile stations 70, 70A, 70B and 70C may determine this correction coefficient $R_M$ while cooperating with the controlling part 43-1 provided to the radio base station in the following ways, for example.

The mobile stations 70, 70A, 70B and 70C do not compute the correction coefficient $R_M$ but append the new transmission rate and the transmission rate applied previously to the transmission-rate update notice instead of the correction coefficient $R_M$.

The controlling part 43-1 computes the correction coefficient $R_M$ on the basis of these transmission rates contained in the transmission-rate update notice, and transmits the transmission-rate update notice containing this correction coefficient $R_M$ to the base station controller 40 through the communication link 53.

The eighth to tenth embodiments given above do not at all describe concretely the frequency and the time point for monitoring the transmission rate.

However, such frequency and time point may be arbitrary in the invention so long as interference occurring in other radio channels is negligibly small.

In the ninth and tenth embodiments described above, the radio base station 42-1 and the mobile stations 70, 70A, 70B and 70C spontaneously transmit the transmission-rate update notice, respectively.

However, the radio base station 42-1 and the mobile stations 70, 70A, 70B and 70C may transmit such a transmission-rate update notice in response to the query generated by the controlling part 41 provided to the base station controller 40 on the basis of the channel control procedure.

Each of the foregoing embodiments represents the application of the invention to a series of channel controls for accomplishing soft hand-off in the CDMA mobile communication system.

However, the invention can be applied similarly to the mobile communication system of other multiple access systems such as the TDMA system, the FDMA system, and the like, besides the CDMA system.

Besides the mobile communication system for executing soft hand-off described above, the invention can be applied to any mobile communication systems as long as the degree of interference occurring in the radio channels other than the new channel can be mitigated when transmitting power of the new channel to which the radio base station forming the new visit-zone transmits communication is unnecessarily large and the communication service involving hand-off can be offered.

In each of the foregoing embodiments, channel control is executed under main control of the base station controller 40 and the communication service involving hand-off is offered to the mobile stations 70, 70A, 70B and 70C in which the call, for which the terminal accommodated through the public communication network serves as the originating party or the destination party, can occur.

However, the invention is not particularly limited to such a mobile communication system connected to the public communication network, but can be likewise applied to a mobile communication system that facilitates transmission of desired speech signals and transmission information between only the mobile stations situated in predetermined wireless zones, for example.

Each of the foregoing embodiments represents the application of the invention to the base station controller 40 for primarily executing channel control for the wireless zones 42Z-1 to 42Z-N individually formed by a plurality of radio base stations 42-1 to 42-N.

However, the invention may be applied similarly in order to materialize the distributed processing executed by a plurality of radio base stations in a mobile communication system that includes such radio base stations directly associating with one another through any communication link.

In each of the foregoing embodiments, transmitting power of the new channel is gradually updated to a greater value at the point at which transmission of the new channel is started, as the starting point.

However, the point at which the processing for gradually updating the value of transmitting power of the new channel to a greater value is to be started may be given as the following messages notified to the radio base stations and to the base station controller by the mobile station that is to transit to the new channel.

Message representing that "transmitting power of the new channel must be increased/decreased";

Message representing the level (transmission quality) of the reception wave reaching the corresponding mobile station through the new channel, and other conditions; and Message representing a predetermined event identified by the mobile station on the basis of the channel control procedure.

In each of the foregoing embodiments, transmitting power of the new channel is gradually updated to a larger value but is not at all updated to a smaller value during the process.

In the invention, however, transmitting power of the new channel may be updated temporarily to a smaller value as long as channel control efficiency can be secured and the drop of quality of the communication service to be achieved remains allowable.

Each of the foregoing embodiments is applied to the speech channel in which both former and new channels are offered for the speech system communication service.

However, such a speech channel may be a radio channel for transmission of images and data, for example.

Each of the foregoing embodiments does not represent a concrete value of the initial value of transmitting power at the point at which transmission of the new channel is started.

However, such an initial value of transmitting power may be any value determined according to any of a field test, a theory and simulation so long as it is greater than the minimum value at which individual mobile station can transmit and it is given as a value suitable for a zone configuration and for the geographical distribution of the mobile stations and for the traffic distribution. The initial value may also be a value that is set in the same way as in the prior art example.

The invention is not limited to the above embodiments and various modifications may be made without departing from the scope and the spirit of the invention. Any improvement may be made in part or all of the components.

What is claimed is:

1. A mobile communication system comprising:
   first and second radio base stations;
   radio base station control equipment for setting communication channels of said first and said second radio base stations; and
   channel controlling means for gradually updating transmitting power of a downstream communication channel of a mobile station that is to be set to said second radio base station, said transmitting power updated from an initial value to a greater value during a hand-off process where said mobile station communicates with said first radio base station or said second radio base station before transmitting power control is executed in accordance with a signal received from the mobile station.

2. The mobile communication system comprising:
   a second radio base station for executing transmitting power control of a downstream speech signal to be transmitted to a mobile station in accordance with a signal received from said mobile station in communication with a first radio base station;
   radio base station control equipment for executing channel control of said first and said second radio base stations;
   notifying means for notifying start of transmission of a downstream communication information to said mobile station through said first radio base station when said second radio base station is selected as a radio base station forming a new visit-zone of said mobile station and the transmission of the downstream communication information starts;
   receiving means for receiving a response transmitted from said mobile station in response to said notice; and
   channel controlling means for judging whether or not to increase transmitting power of said downstream communication information according to said response received by said receiving means and updating said transmitting power to a high value within a predetermined level when the judgment result is true.

3. The mobile communication system comprising:
   a mobile station;
   radio base stations for executing transmitting power control of a downstream communication information to be transmitted to said mobile station in accordance with a signal received from said mobile station and receiving a state notice representing the state of a signal received by a local station, and a periphery base station from said mobile station; and
   channel controlling means for:
   obtaining a difference of propagation loss between a signal received by a radio base station forming a former visit-zone and a signal received by a radio base station forming a new visit-zone according to said state notice at the time of hand-off;
   setting an initial value of transmitting power of a downstream communication information to be transmitted by said radio base station forming said new visit-zone according to said difference and a value of transmitting power of said downstream communication information transmitted by said radio base station forming said former visit-zone; and gradually updating said transmitting power to a greater value.

4. The mobile communication system comprising:
   a mobile station;
   radio base stations for executing transmitting power control of a downstream communication information to be transmitted to said mobile station in accordance with a signal received from said mobile station and receiving a state notice information, which indicates receiving conditions measured by the mobile station with respect to signals transmitted from a local base station, and a peripheral base station, from said mobile station; and
   channel controlling means for obtaining a propagation loss of a transmission channel between said mobile station and a radio base station forming a new visit-zone according to said state notice information at the time of hand-off and setting an initial value of transmitting power at which said radio base station executes transmission to said mobile station with taking said propagation loss into account.

* * * * *